United States Patent

Sakamoto et al.

(10) Patent No.: US 7,037,237 B2
(45) Date of Patent: May 2, 2006

(54) CAR CONTROL APPARATUS AND CONTROL METHOD

(75) Inventors: Hiroshi Sakamoto, Chiyoda-Ku (JP); Takashi Okada, Chiyoda-Ku (JP); Tetsuo Matsumura, Chiyoda-Ku (JP); Toshiharu Kumagai, Wako (JP); Isamu Sunaga, Wako (JP); Sunao Ishihara, Wako (JP)

(73) Assignees: Hitachi, Ltd., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 56 days.

(21) Appl. No.: 10/781,755

(22) Filed: Feb. 20, 2004

(65) Prior Publication Data

US 2004/0192499 A1   Sep. 30, 2004

(30) Foreign Application Priority Data

Mar. 28, 2003  (JP)  ............................. 2003-089851

(51) Int. Cl.
*B60K 41/02* (2006.01)
(52) U.S. Cl. .................. 477/77; 477/76; 477/107; 701/58; 701/67; 701/68; 192/30 W; 192/82 T
(58) Field of Classification Search .................. 477/98, 477/76, 77, 107; 701/58, 67, 68; 192/30 W, 192/82 T
See application file for complete search history.

(56) References Cited

U.S. PATENT DOCUMENTS

| 5,701,984 | A | * | 12/1997 | Park ........................ 192/53.35 |
| 6,145,398 | A | * | 11/2000 | Bansbach et al. ............. 74/335 |
| 6,394,929 | B1 | * | 5/2002 | Miyazaki ..................... 477/77 |
| 6,631,318 | B1 | * | 10/2003 | Kamiya et al. ................ 700/51 |
| 2002/0038747 | A1 | * | 4/2002 | Huschka et al. ......... 192/53.34 |
| 2004/0163917 | A1 | * | 8/2004 | Hiraiwa .................... 192/53.34 |
| 2005/0043139 | A1 | * | 2/2005 | Kennedy ..................... 477/98 |

FOREIGN PATENT DOCUMENTS

JP       2001-213201       7/2001

* cited by examiner

*Primary Examiner*—Charles A. Marmor
*Assistant Examiner*—David D. Le
(74) *Attorney, Agent, or Firm*—Crowell & Moring LLP

(57) ABSTRACT

A car system and control method in which transmission shifting is controlled such that synchronizer damage is avoided. A state discrimination device detects or infers the state of each frictional surface of the synchronizers. A synchronizer for forming an intermediate transfer path is selected according to a parameter indicating the state of the frictional surface detected or inferred by the state discrimination device. Engine torque control reduces the engine torque according to a parameter indicating the state detected or inferred by the state discrimination device.

12 Claims, 21 Drawing Sheets

CAR CONTROL APPARATUS AND CONTROL METHOD

BACKGROUND OF THE INVENTION

The present invention relates to a control unit and a control method for a car loading an automatic transmission and more particularly to a control unit and a control method suited to a car including a synchronizer type transmission having a plurality of gears and a plurality of synchronizer capable of transferring torque from the input shaft to the output shaft as an automatic transmission.

Recently, as a system having a clutch and gear change which are automated using a synchronizer type transmission used for a manual transmission, an automated manual transmission (hereinafter referred to as an automatic MT) has been developed. However, under control by a conventional automatic MT for shifting, the drive torque is interrupted by the clutch disengaging and engaging operation, and the shift quality is degraded, and a sense of incompatibility may be given to a crewman.

Therefore, for example, as described in Japanese Laid-open Patent Publication No. 2001-213201, a method for, when changing the first connection to the second connection, transferring the engine torque from the input shaft to the output shaft by the synchronizer of one selected synchronizer and canceling the interruption of the driving torque is known. By this method, the transfer path formed by the first connection is switched to the transfer path formed by the synchronizer, and then the transfer path formed by the synchronizer is switched to the transfer path formed by the second connection to shift the gear, thus the interruption of the driving torque is canceled and the degradation of the shift quality is prevented.

SUMMARY OF THE INVENTION

However, by the method indicated in Japanese Laid-open Patent Publication No. 2001-213201, when the engine torque is transferred from the input shaft to the output shaft using the transfer path formed by the synchronizer, the temperature of the frictional surface of the synchronizer rises by an effect of the quantity of heat generated in the synchronizer. Therefore, when the gear is shifted in a state that the frictional surface is not cooled sufficiently, the temperature of the frictional surface rises more, and the abrasion of the synchronizer proceeds suddenly, and in the worst case, a problem arises that the synchronizer is damaged by a fire.

An object of the present invention is to provide a car control unit and a control method capable of lightening the load of a synchronizer and preventing the synchronizer from damage by a fire.

To accomplish the above object, the present invention is a car control unit loading an automatic transmission having a plurality of gears and a plurality of synchronizer capable of transferring torque from a drive power source to wheels via a friction clutch, an input shaft, and an output shaft and transferring the torque from the input shaft to the output shaft and having synchronizers capable of transferring the torque by friction to the plurality of synchronizer, the car control unit carrying out shifting by forming a torque transmission path from the input shaft to the output shaft by the connection of the gears and synchronizer, when switching the connection of the gears and synchronizer from the first connection to the second connection, in the state that the friction clutch is engaged, by at least one synchronizer, transferring the torque of the drive power source from the input shaft to the output shaft, and switching a transfer path formed by the first connection to at least one intermediate transfer path formed by the synchronizer and then switching to a transfer path formed by the second connection, wherein the car control unit has a state discrimination means for detecting or inferring the state of the frictional surface of the synchronizer and a synchronizer selecting means for selecting a synchronizer for forming the intermediate transfer path according to a parameter indicating the state of the frictional surface detected or inferred by the state discrimination means.

Further, the car control unit has the state discrimination means for detecting or inferring the state of the frictional surface of the synchronizer and a drive power source torque control means for reducing the drive power source torque according to a parameter indicating the state detected or inferred by the state discrimination means.

Furthermore, the car control unit has the state discrimination means for detecting or inferring the state of the frictional surface of the synchronizer and a shift mode switching means for switching the first shift mode and the second shift mode according to a parameter indicating the state detected or inferred by the state discrimination means.

Further, the car control unit has the state discrimination means for detecting or inferring the state of the frictional surface of the synchronizer, a drive power source torque control means for reducing the drive power source torque according to a parameter indicating the state detected or inferred by the state discrimination means, and a shift mode switching means for switching the first shift mode and the second shift mode according to the parameter indicating the state detected or inferred by the state discrimination means.

By use of such a constitution, the load of the synchronizer is lightened and the synchronizer is prevented from damage by a fire.

DESCRIPTION OF THE PREFERRED EMBODIMENTS

The constitution and operation of the car control unit according to one embodiment of the present invention will be explained below with reference to FIGS. 1 to 22. Firstly by referring to FIG. 1, the constitution of a car system using the car control unit of this embodiment.

Figure 1:
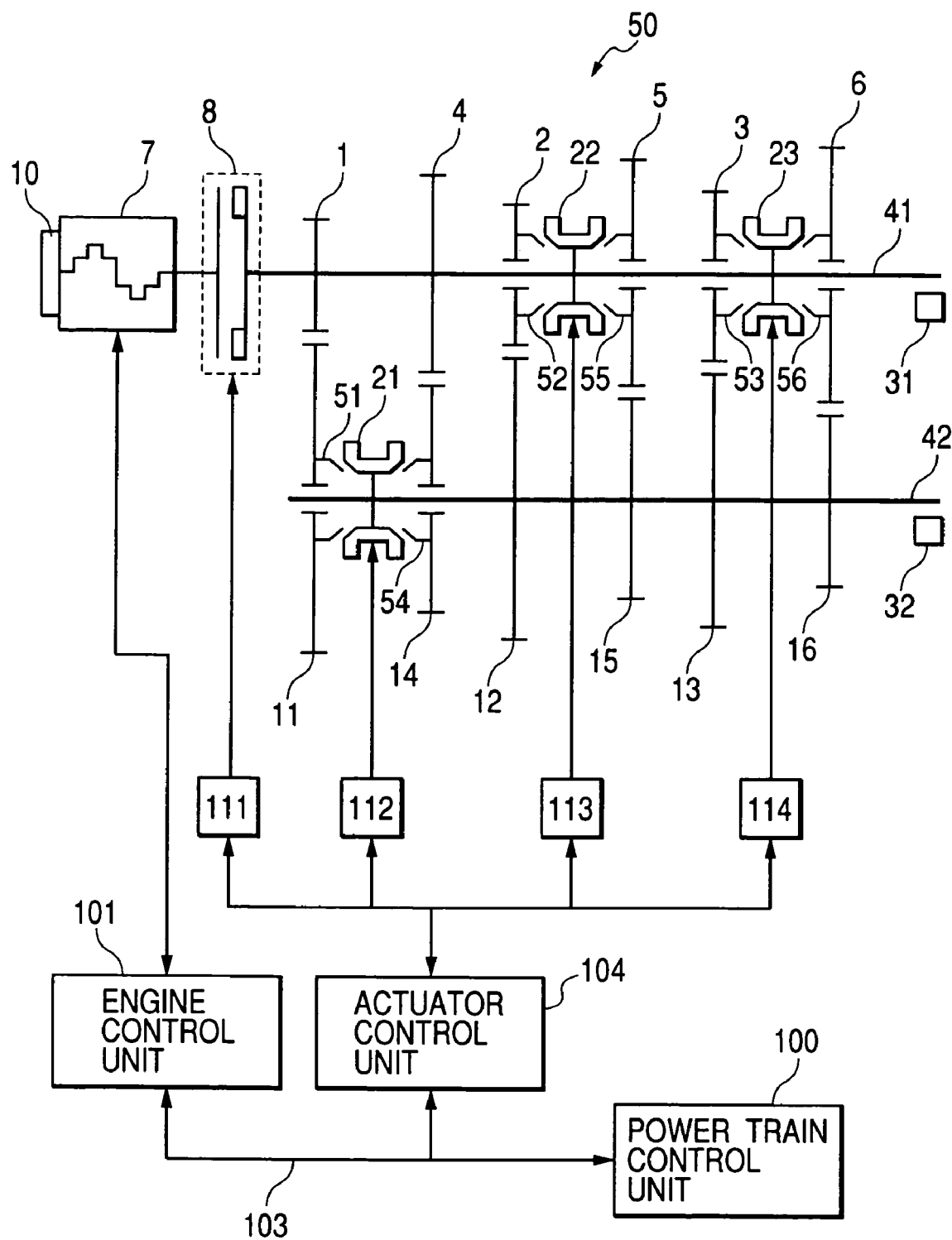
FIG. 1 is a block diagram of a car system using the car control unit according to an embodiment of the present invention.

FIG. 1 is a block diagram of a car system using the car control unit according to one embodiment of the present invention.

An engine 7 which is a drive power source has an engine speed sensor (not shown in the drawing) for measuring the speed of the engine 7, an electronic throttle 10 for adjusting engine torque, and a fuel injector (not shown in the drawing) for injecting a fuel amount corresponding to the amount of intake air. An engine control unit 101, by operating the amount of intake air, fuel amount, and ignition time, can control the torque of the engine 7 with high precision.

As a fuel injector, there are an air intake port injection system injecting fuel to an air intake port and an intra-cylinder injection system directly injecting fuel into the cylinder, though it is advantageous, by comparing the operating region (the region decided by the engine torque and engine speed) required by the engine, to use an engine of a system that the fuel consumption can be reduced and the exhaust performance is good. As a drive power source, not only a gasoline engine but also a diesel engine, a natural gas engine, and a motor may be used.

Between the engine 7 and an input shaft 41 of a transmission 50, a clutch 8 is installed. The clutch 8, by controlling the position thereof by an actuator control unit 104 and an actuator 111, can adjust the pressing force. The power from the engine 7, by engaging the clutch 8, is transferred to the input shaft 41. When the pressing force is adjusted, the torque transferred from the engine 7 to the input shaft 41 can be adjusted. Further, when the clutch 8 is disengaged, the power transfer from the engine 7 to the input shaft 41 can be interrupted. For the clutch 8, a friction clutch of a dry type signal plate system generally used in a car loading a general manual transmission is used. The actuator 111 of the clutch 8 is composed of a motor (not shown in the drawing) and a mechanism for converting the rotary motion of the motor to a linear motion. The pressing force of the clutch 8 is controlled by the actuator 111. Further, for the clutch 8, any of a friction clutch of a wet type multi-plate system, an electromagnetic clutch, and others which can adjust the torque to be transferred may be used.

A transmission 50 has the input shaft 41, an output shaft 42, gears 1, 2, 3, 4, 5, 6, 11, 12, 13, 14, 15, and 16, sleeves 21, 22, and 23, synchronizeres 51, 52, 53, 54, 55, and 56, an input shaft speed sensor 31, and an output shaft speed sensor 32. The gears 2, 3, 5, and 6 are idle gears rotatably attached to the input shaft 41. The gears 11 and 14 are idle gears rotatably attached to the output shaft 42. The gears 1 and 4 are fixed to the input shaft 41. The gears 12, 13, 15, and 16 are fixed to the output shaft 42. The gears 1 and 11, the gears 2 and 12, the gears 3 and 13, the gears 4 and 14, the gears 5 and 15, and the gears 6 and 16 are meshed with each other. The input shaft speed sensor 31 is installed as a means for detecting the speed of the input shaft 41. The output shaft speed sensor 32 is installed as a means for detecting the speed of the output shaft 42. for detecting the speed of the output shaft 42.

The output shaft 42 is connected to the drive wheels via a final gear not shown in the drawing and transfers the torque of the engine 7 to the drive wheels via the clutch 8 and a transmission 50.

Next, the synchronizer mechanism composed of the sleeves and synchronizeres will be explained. The synchronizer mechanism is generally used in a car loading a general manual transmission. The synchronizeres of the synchronizer mechanism synchronize the speed of the input shaft 41 with the speed of the output shaft 42 and the shifting operation can be performed easily. Firstly, the synchronizer mechanism composed of the sleeve 21 and the synchronizer 51 and the synchronizer mechanism composed of the sleeve 21 and the synchronizer 54 will be explained.

On the output shaft 42, the sleeve 21 for directly connecting the gears 11 and 14 to the output shaft 42 is installed. To prevent the gears 11 and 14 from moving axially relative to the output shaft 42, a stopper (not shown in the drawing) is installed. Inside the sleeve 21, slits (not shown in the drawing) meshed with a plurality of slits (not shown in the drawing) of the output shaft 42 are formed, and the sleeve 21 can move axially relative to the output shaft 42, though the movement of the output shaft 42 in the rotational direction is limited. The sleeve 21 is meshed with the output shaft 42, thus the torque of the sleeve 21 is transferred to the output shaft 42. To transfer the torque of the gears 11 and 14 to the output shaft 42, the sleeve 21 is moved axially relative to the output shaft 42 and the gear 11 or 14 is directly connected to the sleeve 21. Further, the synchronizer 51 is installed between the gear 11 and the sleeve 21, and the sleeve 21 is pressed against the synchronizer 51, thus frictional force is generated between the gear 11 and the synchronizer 51. At this time, the torque is transferred from the gear 11 to the sleeve 21 via the synchronizer 51 and the speed of the gear 11 is synchronized with the speed of the sleeve 21. When the speed synchronization is finished, the sleeve 21 passes through the synchronizer 51 and is connected directly to the gear 11. Similarly, the synchronizer 54 is installed between the gear 14 and the sleeve 21, and the sleeve 21 is pressed against the synchronizer 54, thus frictional force is generated between the gear 14 and the synchronizer 54. At this time, the torque is transferred from the gear 14 to the sleeve 21 via the synchronizer 54 and the speed of the gear 14 is synchronized with the speed of the sleeve 21. When the speed synchronization is finished, the sleeve 21 passes through the synchronizer 54 and is connected directly to the gear 14. The actuator 112 of the sleeve 21 is composed of a motor (not shown in the drawing) and a mechanism for converting the rotary motion of the motor to a linear motion and the pressing force from the sleeve 21 to the synchronizer 51 or 54 is controlled by the actuator 112.

Secondly, the synchronizer mechanism composed of the sleeve 22 and the synchronizer 52 and the synchronizer mechanism composed of the sleeve 22 and the synchronizer 55 will be explained.

On the input shaft 41, the sleeve 22 for directly connecting the gears 2 and 5 to the input shaft 41 is installed. To prevent the gears 2 and 5 from moving axially relative to the input shaft 41, a stopper (not shown in the drawing) is installed. Inside the sleeve 22, slits (not shown in the drawing) meshed with a plurality of slits (not shown in the drawing) of the input shaft 41 are formed, and the sleeve 22 can move axially relative to the input shaft 41, though the movement of the input shaft 41 in the rotational direction is limited. The input shaft 41 is meshed with the sleeve 22, thus the torque of the input shaft 41 is transferred to the sleeve 22. To transfer the torque of the input shaft 41 to the gears 2 and 5, the sleeve 22 is moved axially relative to the input shaft 41 and the gear 2 or 5 is directly connected to the sleeve 22. Further, the synchronizer 52 is installed between the gear 2 and the sleeve 22, and the sleeve 22 is pressed against the synchronizer 52, thus frictional force is generated between the synchronizer 52 and the gear 2. At this time, the torque is transferred from the sleeve 22 to the gear 2 via the synchronizer.52 and the speed of the sleeve 22 is synchronized with the speed of the gear 2. When the speed synchronization is finished, the sleeve 22 passes through the synchronizer 52 and is connected directly to the gear 2. Similarly, the synchronizer 55 is installed between the gear 5 and the sleeve 22, and the sleeve 22 is pressed against the synchronizer 55, thus frictional force is generated between the synchronizer 52 and the gear 5. At this time, the torque is transferred from the sleeve 22 to the gear 5 via the synchronizer 52 and the speed of the sleeve 22 is synchronized with the speed of the gear 5. When the speed synchronization is finished, the sleeve 22 passes through the synchronizer 52 and is connected directly to the gear 5. The actuator 113 of the sleeve 22 is composed of a motor (not shown in the drawing) and a mechanism for converting the rotary motion of the motor to a linear motion and the pressing force from the sleeve 22 to the synchronizer 52 or 55 is controlled by the actuator 113.

Thirdly, the synchronizer mechanism composed of the sleeve 23 and the synchronizer 53 and the synchronizer mechanism composed of the sleeve 23 and the synchronizer 56 will be explained.

On the input shaft 41, the sleeve 23 for directly connecting the gears 3 and 6 to the input shaft 41 is installed. To prevent the gears 3 and 6 from moving axially relative to the input shaft 41, a stopper (not shown in the drawing) is installed. Inside the sleeve 23, slits (not shown in the drawing) meshed with a plurality of slits (not shown in the drawing) of the input shaft 41 are formed, and the sleeve 23 can move axially relative to the input shaft 41, though the movement of the input shaft 41 in the rotational direction is limited. The input shaft 41 is meshed with the sleeve 23, thus the torque of the input shaft 41 is transferred to the sleeve 23. To transfer the torque of the input shaft 41 to the gears 3 and 6, the sleeve 22 is moved axially relative to the input shaft 41 and the gear 3 or 6 must be connected directly to the sleeve 23. Further, the synchronizer 53 is installed between the gear 3 and the sleeve 23, and the sleeve 23 is pressed against the synchronizer 53, thus frictional force is generated between the synchronizer 53 and the gear 3. At this time, the torque is transferred from the sleeve 23 to the gear 3 via the synchronizer 53 and the speed of the sleeve 23 is synchronized with the speed of the gear 3. When the speed synchronization is finished, the sleeve 23 passes through the synchronizer 53 and is connected directly to the gear 3. Similarly, the synchronizer 56 is installed between the gear 6 and the sleeve 23, and the sleeve 23 is pressed against the synchronizer 56, thus frictional force is generated between the synchronizer 56 and the gear 6. At this time, the torque is transferred from the sleeve 23 to the gear 6 via the synchronizer 56 and the speed of the sleeve 23 is synchronized with the speed of the gear 6. When the speed synchronization is finished, the sleeve 23 passes through the synchronizer 53 and is connected directly to the gear 6. The actuator 114 of the sleeve 23 is composed of a motor (not shown in the drawing) and a mechanism for converting the rotary motion of the motor to a linear motion and the pressing force from the sleeve 23 to the synchronizer 53 or 56 is controlled by the actuator 114.

The engine 7 is controlled by the engine control unit 101. The actuators 111, 112, 113, and 114 are controlled by the actuator control unit 104. Further, in this embodiment, for the actuators 111, 112, 113, and 114, a combination of a motor and a mechanism is used. However, a hydraulic actuator using a solenoid valve may be adopted.

To a power train control unit 100, various signals are input from an accelerator opening sensor, a brake switch, and an inhibitor switch which are not shown in the drawings and the operation states (clutch position, shift position, speed, torque, etc.) of the engine 7, the clutch 8, and the transmission 50 are input. The power train control unit 100, on the basis of these input signals, controls the engine control unit 101 and the actuator control unit 104 using a LAN (local area network) 103.

In this embodiment, in FIG. 1, the gear train composed of the gears 1 and 11 is assumed as 1st gear, and the gear train composed of the gears 2 and 12 is assumed as 2nd gear, and the gear train composed of the gears 3 and 13 is assumed as 3rd gear, and the gear train composed of the gears 4 and 14 is assumed as 4th gear, and the gear train composed of the gears 5 and 15 is assumed as 5th gear, and the gear train composed of the gears 6 and 16 is assumed as 6th gear. Further, the synchronizer mechanism composed of the sleeve 21 and the synchronizeres 51 and 54 is assumed as shift A, and the synchronizer mechanism composed of the sleeve 22 and the synchronizeres 52 and 55 is assumed as shift B, and the synchronizer mechanism composed of the sleeve 23 and the synchronizeres 53 and 56 is assumed as shift C. The actuator control unit 104, by controlling the currents of the motors installed in the actuator 112 of the shift A, the actuator 113 of the shift B, and the actuator 114 of the shift C, can control the pressing loads or positions for operating the first sleeve 21, the second sleeve 22, and the third sleeve 23.

Next, by referring to FIG. 2, the constitution of a synchronizer mechanism used for a transmission controlled by the control unit of the automatic transmission of this embodiment will be explained.

Figure 2:
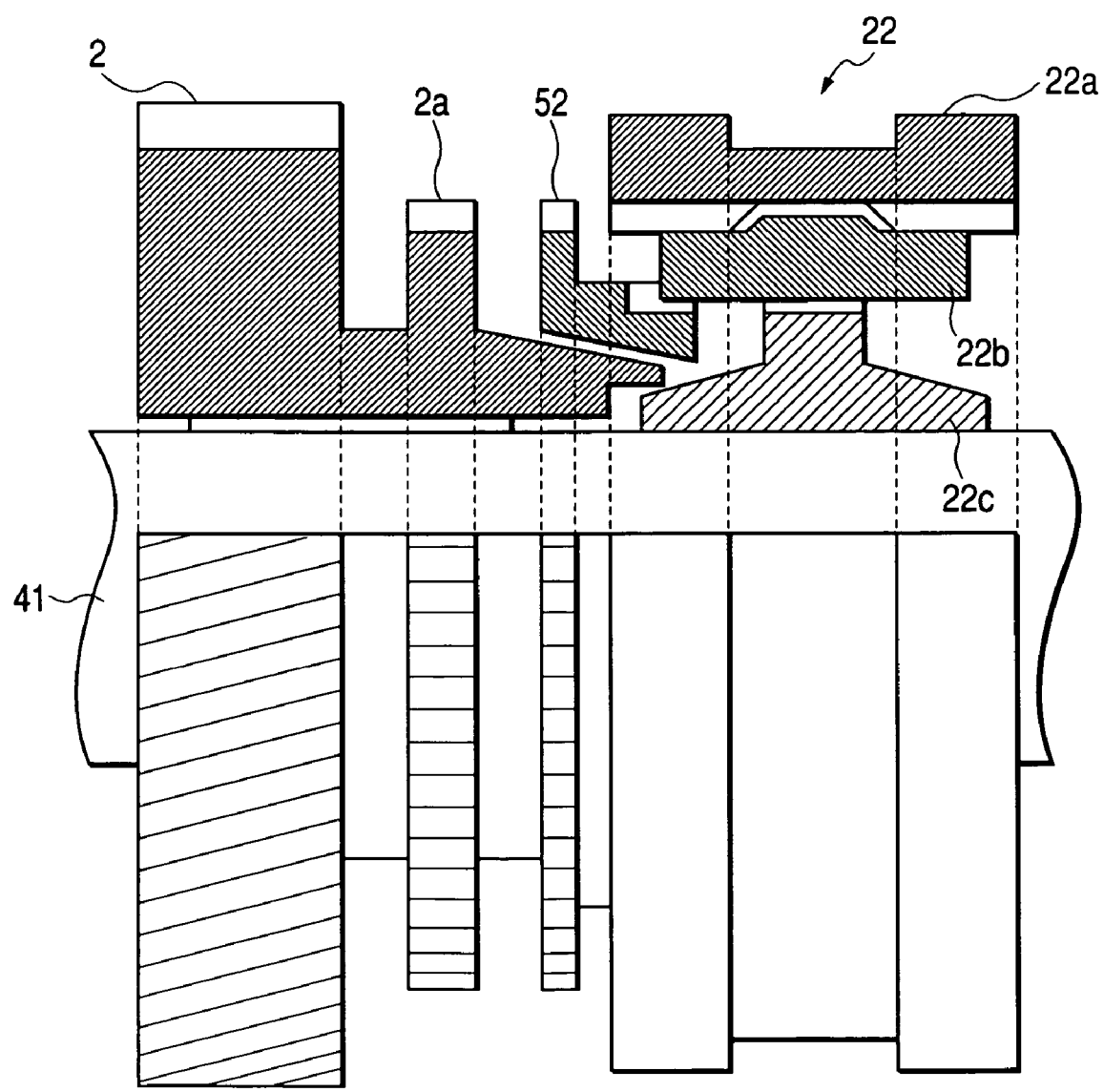
FIG. 2 is an enlarged cross sectional view of a synchronizer mechanism used for a transmission controlled by the control unit of the automatic transmission according to an embodiment of the present invention.

FIG. 2 is an enlarged cross sectional view of a synchronizer mechanism used for a transmission controlled by the control unit of the automatic transmission according to an embodiment of the present invention. FIG. 2 shows the sleeve 22, the synchronizer 52, the input shaft 41, and the gear 2 shown in FIG. 1 which are extracted and enlarged.

The sleeve 22 is composed of a clutch sleeve 22a, a synchronizer key 22b, and a synchronizer hub 22c. In the synchronizer mechanism shown in FIG. 2, the clutch sleeve 22a is spline-fit into the synchronizer hub 22c rotating integrally with the input shaft 41. When a pressing load is applied to the clutch sleeve 22a, the synchronizer key 22b moves together with the clutch sleeve 22a and presses the synchronizer 52 (referred to as a synchronizer ring) to the cone part of the gear 2 rotatably supported by the input shaft 41 on the end face thereof. Friction is caused on the cone face of the synchronizer 52 and the gear 2, thus the torque is transferred, and the rotation of the gear 2 slowly approaches the rotation of the sleeve 22.

When the clutch sleeve 22a moves further, thereby is disengaged from the synchronizer key 22b, the clutch sleeve 22a directly presses the synchronizer 52. Then, friction is caused on the cone face of the synchronizer 52 and the gear 2, thus the torque is transferred, and the rotation of the gear 2 coincides with, that is, synchronizes with the rotation of the clutch sleeve 22a.

Then, the synchronizer 52 becomes rotatable and does not disturb movement of the clutch sleeve 22a. As a result, the clutch sleeve 22a passes through the synchronizer 52 and perfectly meshes with the dog teeth 2a of the gear 2 and the engagement is completed.

Next, by referring to FIG. 2, the heat quantity generated in the synchronizer will be explained. Assuming the speed of the gear 2 as N2, the speed of the sleeve 22 as Ns, and the torque transferred by the synchronizer as Tc, the instantaneous heat quantity IQs (heat quantity per unit time generated in the synchronizer) can be calculated as $IQs=(|N2-Ns|) \times Tc \times k$, where k indicates a unit conversion coefficient for converting the speed [r/min] to the angular speed [rad/s]. Assuming the reduction ratio of the 2nd gear as G2, the input shaft speed as Ni, and the output shaft speed as No, $N2=No \times G2$ and $Ns=Ni$, so that the instantaneous heat quantity IQs can be calculated as $IQs=(|No \times G2-Ni|) \times Tc \times k$. Further, the torque Tc transferred by the synchronizer can be calculated from the pressing load onto the clutch sleeve 22a, the effective radius of the cone face of the synchronizer and the gear 2, the coefficient of friction, and the number of cone faces. Therefore, the instantaneous heat quantity IQs is calculated in the power train control unit 100, thus the heat quantity generated in the synchronizer during shifting and the heat quantity accumulated in the synchronizer by shifting can be inferred.

In this embodiment, a single cone type that the synchronizer mechanism has one cone face is used. However, there are a double cone type having two cone faces and a triple cone type having three cone faces available and to transfer large torque with a low pressing load, it is advantageous to use a bulk synchronizer mechanism having a plurality of cone faces. Further, in this embodiment, a synchronizer mechanism of an inertia lock type is used. However, there are additionally various kinds of types available such as a pin type and a servo type and any type is acceptable.

Next, by referring to FIG. 3, the constitution of the power train control unit 100 which is the car control unit of this embodiment will be explained.

Figure 3:
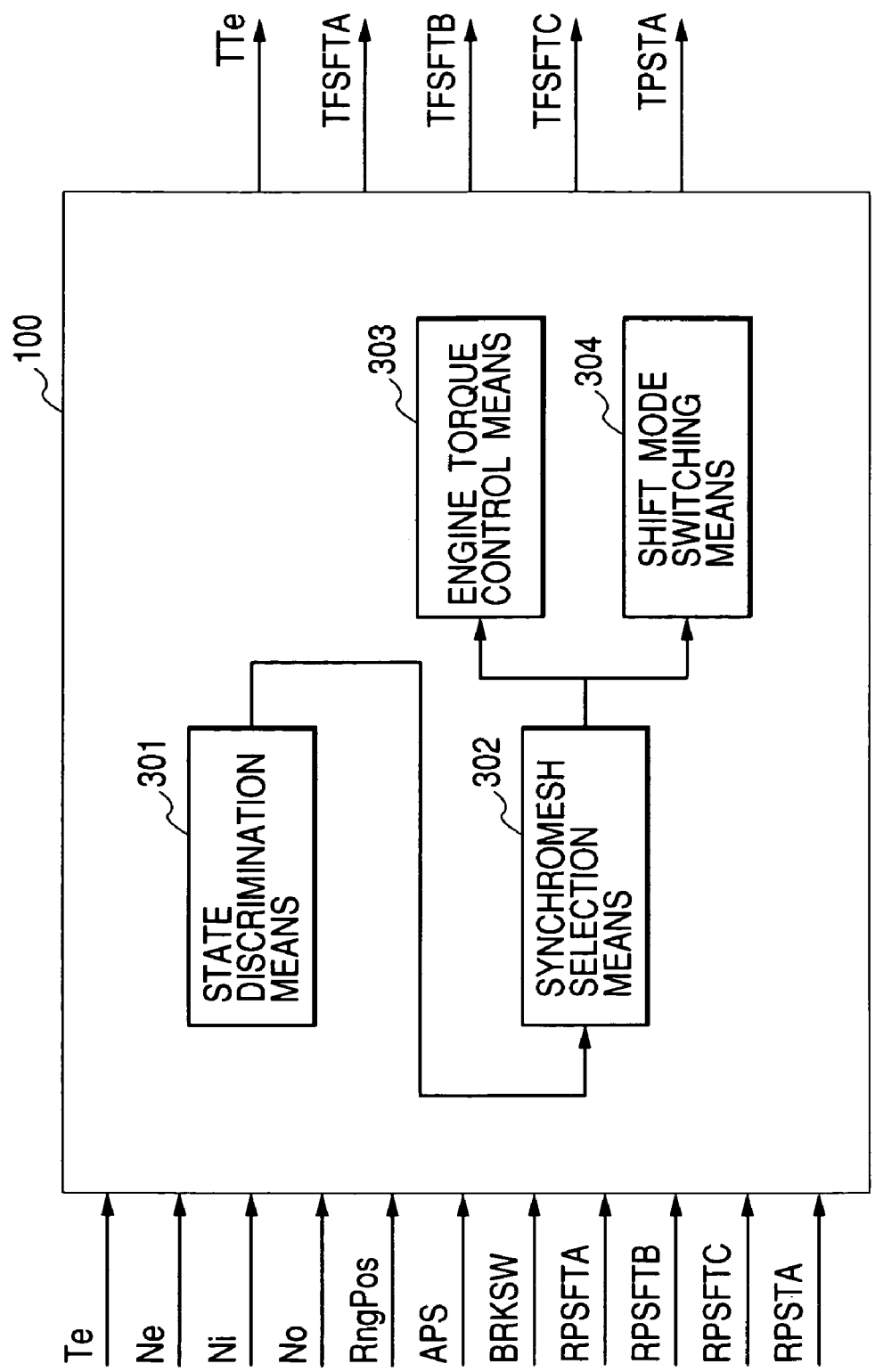
FIG. 3 is a control block diagram showing the constitution of the power train control unit 100 which is the car control unit according to an embodiment of the present invention.

FIG. 3 is a control block diagram showing the constitution of the power train control unit 100 which is the car control unit according to an embodiment of the present invention.

To the power train control unit 100, signals of the engine torque Te, the engine speed Ne, the input shaft speed Ni, and the output shaft speed No are input. Further, to detect the state of the range operation or acceleration/brake operation of a driver, to the power train control unit 100, signals of the range position RngPs, the accelerator opening APS, and the brake switch BRKSW are input. Furthermore, to detect the state of the transmission 50, to the power train control unit 100, the shift A position RPSFTA, shift B position RPSFTB, and shift C position RPSFTC equivalent to the strokes of the sleeves 21, 22, and 23 are input and the clutch position RPSTA equivalent to the stroke of the clutch 8 is input. The power train control unit 100 calculates the target engine torque TTe on the basis of these input signals and transmits it to the engine control unit 101 by the LAN 103 which is a communication means. The engine control unit 101 calculates the throttle valve opening, fuel amount, and ignition time for realizing the target engine torque TTe and controls the respective actuators. Further, the power train control unit 100 calculates the shift A target load TFSFTA, shift B target load TFSFTB, and shift C target load TFSFTC, and clutch target position TPSTA and transmits them to the actuator control unit 104 by the LAN 103 which is a communication unit. The actuator control unit 104 calculates motor torque for realizing the shift A target load TFSFTA, shift B target load TFSFTB, and shift C target load TFSFTC, and clutch target position TPSTA and controls the respective actuators.

The power train control unit 100 calculates a shift instruction on the basis of the vehicle speed VSP and accelerator opening APS calculated on the basis of the output shaft speed No. Further, in a car system having a mode (hereinafter, referred to as a manual mode) for deciding shifting timing by a driver by operating the manual switch, the power train control unit 100 calculates a shift instruction on the basis of the driver's operation.

The power train control unit 100 has a state discrimination means 301, a synchronizer selection means 302, an engine torque control means 303, and a shift mode switching means 304. The state discrimination means 301 detects or infers parameters (temperature, heat quantity, and abrasion loss of the frictional surface) indicating the state of the frictional surface of the synchronizer on the basis of the state of a car and shift pattern. The synchronizer selection means 302, to transfer torque from the input shaft 41 to the output shaft 42 during shifting according to at least one parameter indicating the state detected or inferred by the state discrimination means 301, selects at least one synchronizer. Further, the engine torque control unit 303, according to the synchronizer selected by the synchronizer selection means 302 and at least one parameter indicating the state detected or inferred by the state discrimination means 301, controls the torque of the engine 7. Furthermore, the shift mode switching means 304, according to the synchronizer selected by the synchronizer selection means 302 and at least one parameter indicating the state detected or inferred by the state discrimination means 301, decides whether or not to transfer the torque during shifting and when the torque is not to be transferred during shifting, disengages the clutch 8 and shifts the gear.

Next, by referring to FIGS. 4 to 13, the control method during shifting for the power train control unit 100 which is the car control unit of this embodiment will be explained.

Firstly, referring to FIG. 4, the outline of the overall control contents of the car control unit of this embodiment will be explained.

Figure 4:
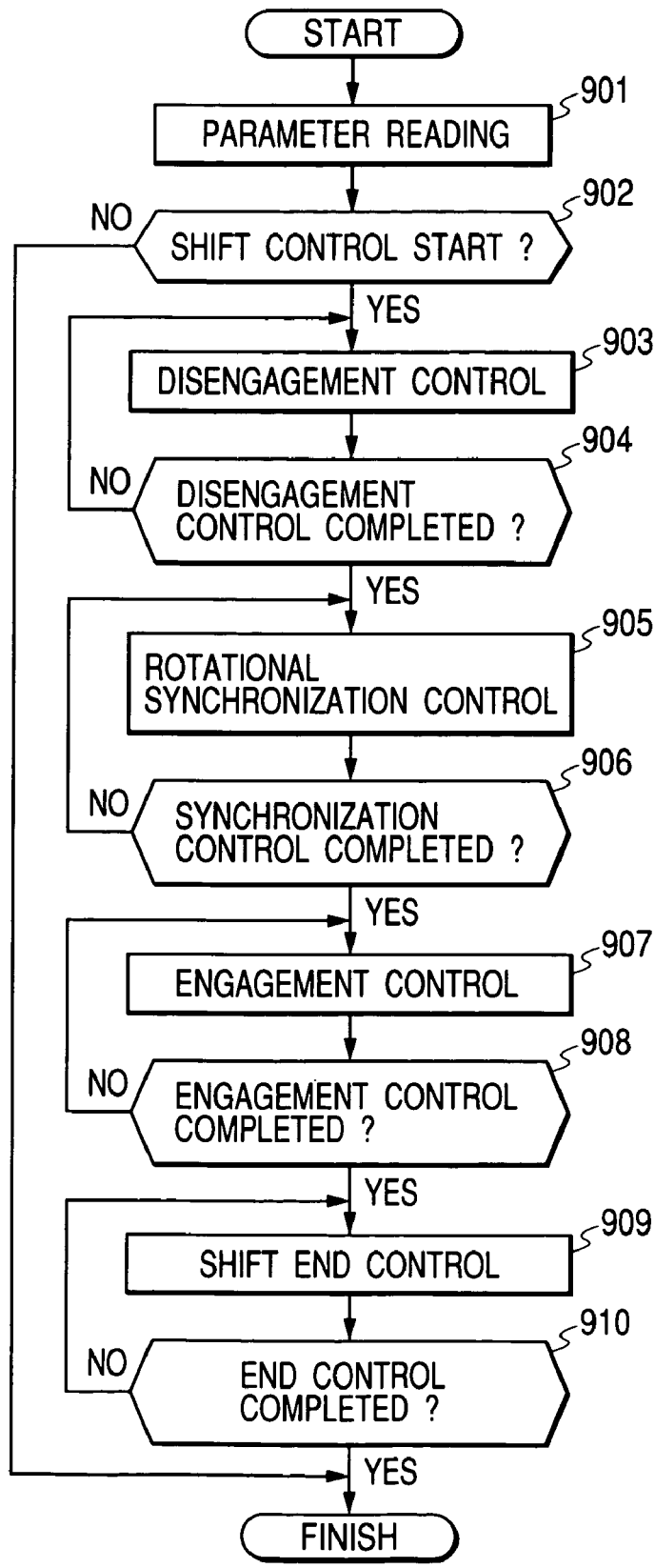
FIG. 4 is a flow chart showing the outline of overall control contents of the car control unit according to an embodiment of the present invention.

FIG. 4 is a flow chart showing the outline of the overall control contents of the car control unit according to an embodiment of the present invention.

The shift control contents indicated below are programmed in the power train control unit 100 and are repeatedly executed in a predetermined cycle. Namely, the processes at Steps 901 to 910 indicated below are executed by the power train control unit 100.

At Step 901, the power train control unit 100 reads parameters using Steps 902 to 910.

At Step 902, the power train control unit 100 sets a gear position, when the current gear position is different from the set gear position, judges as shifting start, and goes to Step 903. When the current gear position is the same as the set gear position, the power train control unit 100 judges as unnecessity of shifting and ends the processing.

When the shift control starts, at Step 903 (the disengagement control phase), to disengage the gear, the power train control unit 100 executes disengagement control. The disengagement control will be described later in detail.

Next, at Step 904, the power train control unit 100 decides whether the disengagement control is completed or not and when the disengagement control is completed, it goes to Step 905, and when the disengagement control is not completed, it executes Step 903 again. In this case, when the decision at Step 904 is down shift (3rd gear→2nd gear), to decide whether the sleeve 23 is disengaged from the gear 3 or not, the power train control unit 100 decides whether the shift C position RPSFTC, which is a stroke signal of the sleeve 23, is a position which can be decided as a disengagement position.

Next, at Step 905 (the rotation synchronization control phase), to make the input shaft speed Ni synchronize with the speed (the target speed) equivalent to the next gear position, the power train control unit 100 controls the pressing load to the synchronizer executing torque transfer during shifting and the torque of the engine 7. The rotation synchronization control will be described later in detail.

And, at Step 906, the power train control unit 100 decides whether the rotation synchronization control is completed or not. In this case, the completion condition of the rotation synchronization control, when the difference between the input shaft speed Ni and the speed (the target speed) equivalent to the next gear position is small, it is assumed that (input shaft speed Ni—output shaft speed No×target gear ratio Gn of gear position| is small). When the synchronization control is completed, the power train control unit 100 goes to Step 907 and when the synchronization control is not completed, it goes to Step 905 again and continues the synchronization control.

When the synchronization control is completed, at Step 907 (the engagement control phase), to engage the gear, the power train control unit 100 executes the engagement control.

Next, at Step 908, the power train control unit 100 decides whether the engagement control is completed or not. In this case, when the completion condition of the engagement control is down shift (3rd gear→2nd gear), to decide whether the sleeve 22 is meshed with the gear 2 or not, the power train control unit 100 decides whether the shift B position RPSFTB, which is a stroke signal of the sleeve 22, is a position which can be decided as an engagement position. When the engagement control is completed, the power train control unit 100 goes to Step 909 and when the engagement control is not completed, it goes to Step 907 again and continues the engagement control.

When the engagement control is completed, at Step 909 (the shift end phase), the power train control unit 100 executes the shift end control. The shift end control will be described later in detail.

Next, at Step 910, the power train control unit 100 decides whether the shift is completed or not. In this case, when the completion condition of the shift end control is down shift (3rd gear→2nd gear), the power train control unit 100 decides whether the shift A position RPSFTA and the shift C position RPSFTC, which are stroke signals of the sleeves 21 and 23, are close to the neutral position or not. Further, when the torque of the engine 7 is controlled during shifting, to return the torque of the engine 7 to the torque equivalent to the accelerator opening under the shift end control, the condition for whether the torque of the engine 7 is returned to the torque equivalent to the accelerator opening or not on the basis of the throttle valve opening is added to the completion condition of the shift end control. When the shifting is completed, the power train control unit 100 ends the processing and when the shift control is not completed, it continues Step 909 again.

Next, by referring to FIGS. 5 to 13, concrete control contents during shifting of the car control unit of this embodiment will be explained.

Figure 5:
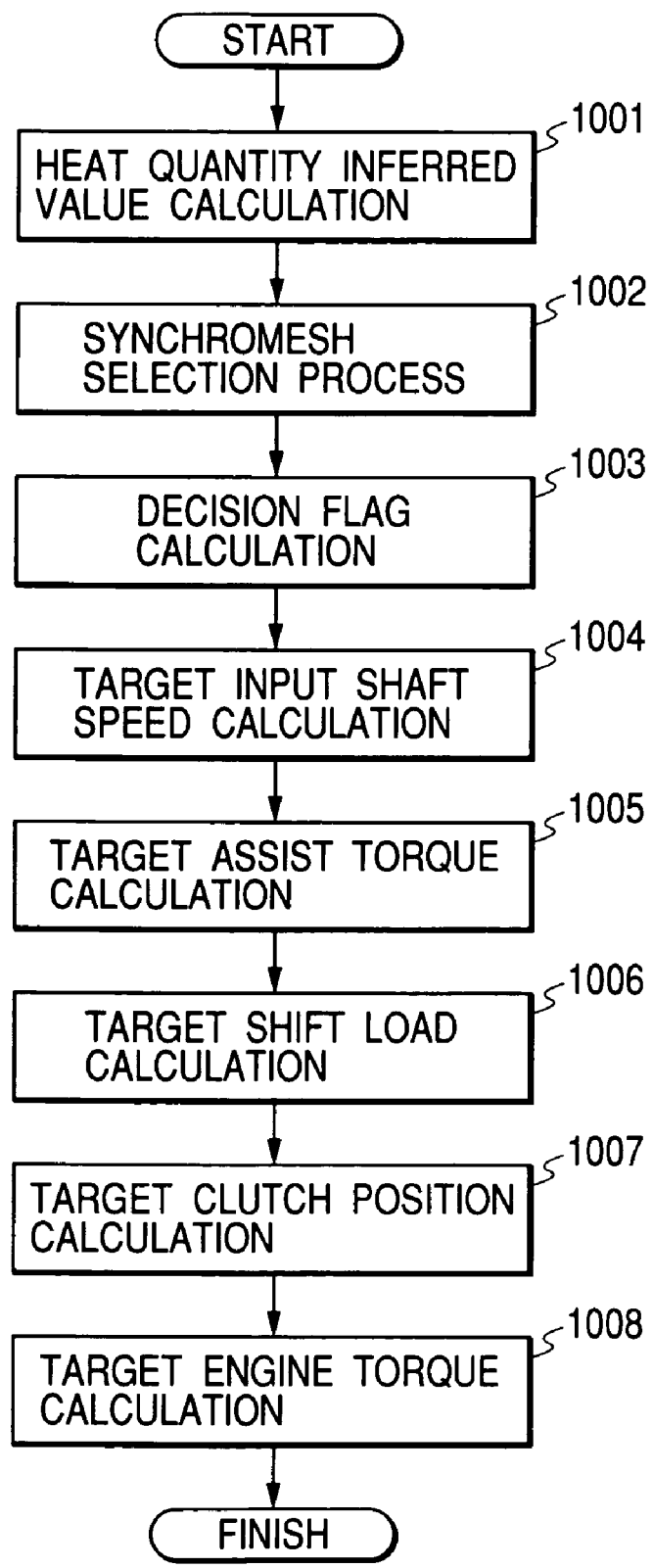
FIG. 5 is a flow chart showing overall processing contents of the concrete control contents during shifting of the car control unit according to an embodiment of the present invention.

FIG. 5 shows overall control contents during shifting of the car control unit of this embodiment. The flow chart shown in FIG. 5 indicates processes of calculating and deciding the parameters at Step 403 (the disengagement control process), Step 405 (the rotation synchronization control process), and Step 407 (the engagement control process) shown in FIG. 4.

FIG. 5 is a flow chart showing overall processing contents of the concrete control contents during shifting of the car control unit according to an embodiment of the present invention.

The shift control flow is composed of Step 1001 (the heat quantity inferred value calculation), Step 1002 (the synchronizer selection process), Step 1003 (the decision flag calculation), Step 1004 (the target input shaft speed calculation), Step 1005 (the target assist torque calculation), Step 1006 (the target shift load calculation), Step 1007 (the target clutch position calculation), and Step 1008 (the target engine torque calculation).

The processes at Steps 1001 to 1008 are executed by the power train control unit 100. For example, the state discrimination means 301 shown in FIG. 3 is realized by Step 1001 (the heat quantity inferred value calculation), Step 1002 (the synchronizer selection process), and Step 1003 (the decision flag calculation). Similarly, the synchronizer selection means 302 shown in FIG. 3 is realized by Step 1002 (the synchronizer selection process). Similarly, the engine torque control means 303 shown in FIG. 3 is realized by Step 1003 (the decision flag calculation) and Step 1008 (the target engine torque calculation), and the shift mode switching means 304 shown in FIG. 3 is realized by Step 1003 (the decision flag calculation), Step 1006 (the target shift load calculation), Step 1007 (the target clutch position calculation), and Step 1008 (the target engine torque calculation). Here, the realizing methods for Steps 301 to 304 will be explained in correspondence with Steps 1001 to 1008. However, the steps are not limited to the methods indicated at Steps 1001 to 1008 and for example, when the object to be discriminated by the state discrimination means 301 is not a heat quantity, the processes performed by the respective steps are not limited to the aforementioned contents.

Step 1001 (the heat quantity inferred value calculation) will be described later in detail by referring to FIG. 6. Step 1002 (the synchronizer selection process) will be described later in detail by referring to FIG. 7. Step 1003 (the decision flag calculation) will be described later in detail by referring to FIG. 8. Step 1004 (the target input shaft speed calculation) will be described later in detail by referring to FIG. 9. Step 1005 (the target assist torque calculation) will be described later in detail by referring to FIG. 10. Step 1006 (the target shift load calculation) will be described later in detail by referring to FIG. 11. Step 1007 (the target clutch position calculation) will be described later in detail by referring to FIG. 12. Step 1008 (the target engine torque calculation) will be described later in detail by referring to FIG. 13.

Next, by referring to FIG. 6, Step 1001 (the heat quantity inferred value calculation) shown in FIG. 5 will be described in detail.

Figure 6:
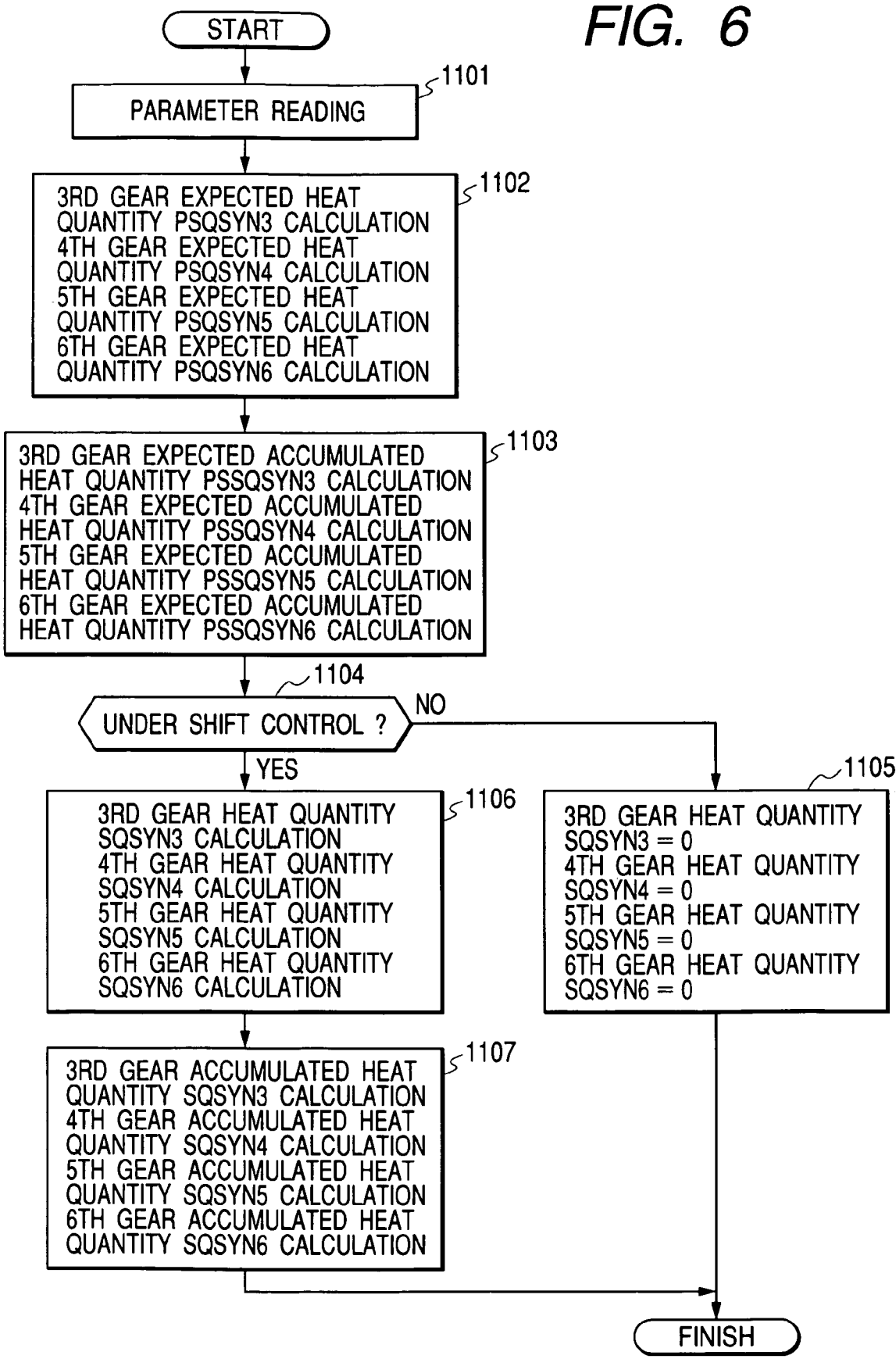
FIG. 6 is a flow chart showing processing contents of the heat quantity inferred value calculation in the car control unit according to an embodiment of the present invention.

FIG. 6 is a flow chart showing processing contents of the heat quantity inferred value calculation in the car control unit according to an embodiment of the present invention.

Firstly, at Step 1101, the power train control unit 100 reads the parameters to be used at Steps 1102 to 1107.

Next, at Step 1102, the power train control unit 100 calculates an expected heat quantity PSQSYN expected to be generated in the synchronizer at the time of next shifting. Here, the expected heat quantity of the synchronizer 53 is assumed as 3rd gear expected heat quantity PSQSYN3, the expected heat quantity of the synchronizer 54 as 4th gear expected heat quantity PSQSYN4, the expected heat quantity of the synchronizer 55 as 5th gear expected heat quantity PSQSYN5, and the expected heat quantity of the synchronizer 56 as 6th gear expected heat quantity PSQSYN6. The expected heat quantity PSQSYN can be obtained from the instantaneous heat quantity IQs explained in FIG. 2. The expected heat quantity PSQSYN is, for example, like (J') shown in FIG. 21.

Next, at Step 1103, the power train control unit 100, on the basis of the expected heat quantity PSQSYN calculated at Step 1102, calculates an expected accumulated heat quantity PSSQSYN expected to be accumulated in the synchronizer by the next shifting. Here, the expected accumulated heat quantity of the synchronizer 53 is assumed as 3rd gear expected accumulated heat quantity PSSQSYN3, the expected accumulated heat quantity of the synchronizer 54 as 4th gear expected accumulated heat quantity PSSQSYN4, the expected accumulated heat quantity of the synchronizer 55 as 5th gear expected accumulated heat quantity PSSQSYN5, and the expected accumulated heat quantity of the synchronizer 56 as 6th gear expected accumulated heat quantity PSSQSYN6. The expected accumulated heat quantity PSSQSYN can be obtained from the instantaneous heat quantity IQs explained in FIG. 2. The expected accumulated heat quantity PSSQSYN is, for example, like (J") shown in FIG. 22.

Next, at Step 1104, the power train control unit 100 decides whether the synchronizer is under shift control or not, and when the synchronizer is not under shift control, it goes to Step 1105, and when the synchronizer is under shift control, it goes to Step 1106.

When the synchronizer is not under shift control, at Step 1105, the power train control unit 100 initializes the heat quantity calculated under shift control and ends the processing.

When the synchronizer is under shift control, at Step 1106, the power train control unit 100 calculates the heat quantity SQSYN of the synchronizer during shifting. Here, the heat quantity of the synchronizer 53 is assumed as 3rd gear heat quantity SQSYN3, the heat quantity of the synchronizer 54 as 4th gear heat quantity SQSYN4, the heat quantity of the synchronizer 55 as 5th gear heat quantity SQSYN5, and the heat quantity of the synchronizer 56 as 6th gear heat quantity SQSYN6. The heat quantity SQSYN can be obtained from the instantaneous heat quantity IQs explained in FIG. 2. The heat quantity SQSYN is, for example, like (J') shown in FIG. 21.

Next, at Step 1107, the power train control unit 100, on the basis of the heat quantity SQSYN calculated at Step 1106, calculates the accumulated heat quantity SSQSYN accumulated in the synchronizer by shifting and ends the processing. Here, the accumulated heat quantity of the synchronizer 53 is assumed as 3rd gear accumulated heat quantity SSQSYN3, the accumulated heat quantity of the synchronizer 54 as 4th gear accumulated heat quantity SSQSYN4, the accumulated heat quantity of the synchronizer 55 as 5th gear accumulated heat quantity SSQSYN5, and the accumulated heat quantity of the synchronizer 56 as 6th gear accumulated heat quantity SSQSYN6. The accumulated heat quantity SSQSYN can be obtained from the instantaneous heat quantity IQs explained in FIG. 2. The accumulated heat quantity SSQSYN is, for example, like (J") shown in FIG. 22.

Next, by referring to FIG. 7, Step 1002 (the synchronizer selection process) shown in FIG. 5 will be described in detail.

Figure 7:
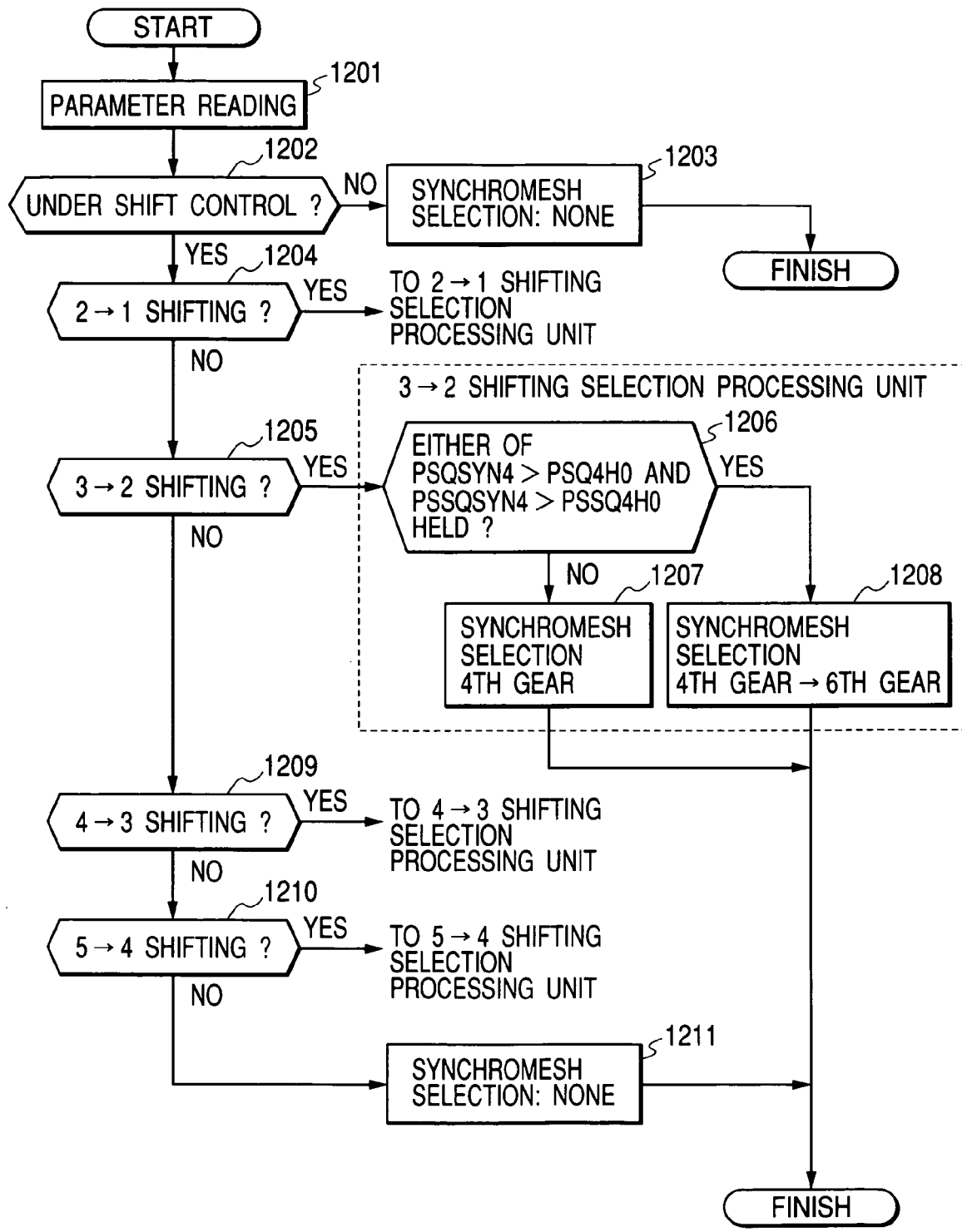
FIG. 7 is a flow chart showing processing contents of the synchronizer selection process in the car control unit according to an embodiment of the present invention.

FIG. 7 is a flow chart showing processing contents of the synchronizer selection process in the car control unit according to an embodiment of the present invention.

Firstly, at Step 1201, the power train control unit 100 reads the parameters to be used at Steps 1202 to 1211.

Next, at Step 1202, the power train control unit 100 decides whether the synchronizer is under shift control or not, and when the synchronizer is not during shifting, it goes to Step 1203, and when the synchronizer is during shifting, it goes to Step 1204.

When the synchronizer is not during shifting, at Step 1203, the power train control unit 100 ends the processing on the assumption that all the synchronizeres are not to be selected.

When the synchronizer is during shifting, at Step 1204, the power train control unit 100 decides whether it is shifting of 2-1 or not, and when it is shifting of 2-1, the power train control unit 100 goes to a 2-1 shift selection processing unit not shown in the drawing, selects a synchronizer transferring torque during shifting, and ends the processing. The processing contents of the 2-1 shift selection processing unit are the same as those of a 3-2 shift selection processing unit which will be explained at Steps 1206 to 1208.

When it is not shifting of 2-1, at Step 1205, the power train control unit 100 decides whether it is shifting of 3-2 or not, and when it is shifting of 3-2, the power train control unit 100 goes to the 3-2 shift selection processing unit described at Steps 1206 to 1208.

At Step 1206, the power train control unit 100 decides whether either of the conditions indicated by Formulas (1) and (2) given below is held or not.

4th gear expected heat quantity
PSQSYN4>PSQ4H0— (1)

4th gear expected accumulated heat quantity
PSSQSYN4>PSSQ4H0 (2)

Here, PSQ4H0 is a preset expected heat quality threshold value and PSSQ4H0 is a preset expected accumulated heat quality threshold value.

When all the formulas (1) and (2) are not held, the power train control unit 100 goes to Step 1207 and when any of the formulas (1) and (2) is held, the power train control unit 100 goes to Step 1208. In this embodiment, at the time of shift-down of 3rd gear—2nd gear, a 3-4-2 torque transfer system performing torque transfer using only the 4th gear synchronizer 54 and a 3-4-6-2 torque transfer system performing torque transfer using the 4th gear synchronizer 54 and the 6th gear synchronizer 56 can be selected. Namely, using a gear position having a smaller reduction ratio than that of the gear position before shifting, the torque is transferred during shifting. Further, the 3-4-6-2 torque transfer system will be described later in detail by referring to FIGS. 14 to 17. The 3-4-2 torque transfer system will be described later in detail by referring to FIG. 18.

When the power train control unit 100 decides that the temperature of the synchronizer 54 does not rise excessively even if the torque is transferred during shifting only by the 4th gear synchronizer 54, at Step 1207, it selects the 4th gear synchronizer 54 and ends the processing.

If any of the formulas (1) and (2) is held, when the torque is transferred during shifting only by the 4th gear synchronizer 54, the power train control unit 100 decides that the temperature of the synchronizer 54 rises excessively and at Step 1208, to switch the 4th gear synchronizer 54 to the 6th gear synchronizer 56 and transfer the torque during shifting, it selects the 4th gear synchronizer 54 and the 6th gear synchronizer 56 and ends the processing.

In this embodiment, a case that the torque is transferred by the 4th gear synchronizer 54 during shifting and a case that the 4th gear synchronizer 54 and the 6th gear synchronizer 56 are switched and the torque is transferred during shifting are explained. However, if synchronizeres can transfer the torque during shifting according to the layout (gear arrangement, synchronizer mechanism arrangement, etc.) of the transmission 50, any of the synchronizeres may be selected.

When the shifting is not shifting of 3-2, at Step 1209, the power train control unit 100 decides whether it is shifting of 4-3 or not, and when it is shifting of 4-3, the power train control unit 100 goes to a 4-3 shift selection processing unit not shown in the drawing, and selects a synchronizer transferring the torque during shifting, and ends the processing. The processing contents of the 4-3 shift selection processing unit are the same as those of the 3-2 shift selection processing unit mentioned above.

When the shifting is not shifting of 4-3, at Step 1210, the power train control unit 100 decides whether it is shifting of 5-4 or not, and when it is shifting of 5-4, the power train control unit 100 goes to a 5-4 shift selection processing unit not shown in the drawing, and selects a synchronizer transferring the torque during shifting, and ends the processing. The processing contents of the 5-4 shift selection processing unit are the same as those of the 3-2 shift selection processing unit mentioned above.

When the shifting is not shifting of 5-4 at Step 1210, at Step 1211, the power train control unit 100 ends the processing on the assumption that all the synchronizeres are not to be selected.

Further, in this embodiment, there is no gear position whose reduction ratio is smaller than that of the 6th gear, so that in a case of shifting of 6-5, the clutch 8 is disengaged and the gear is shifted.

Next, by referring to FIG. 8, Step 1003 (the decision flag calculation) shown in FIG. 5 will be described in detail.

Figure 8:
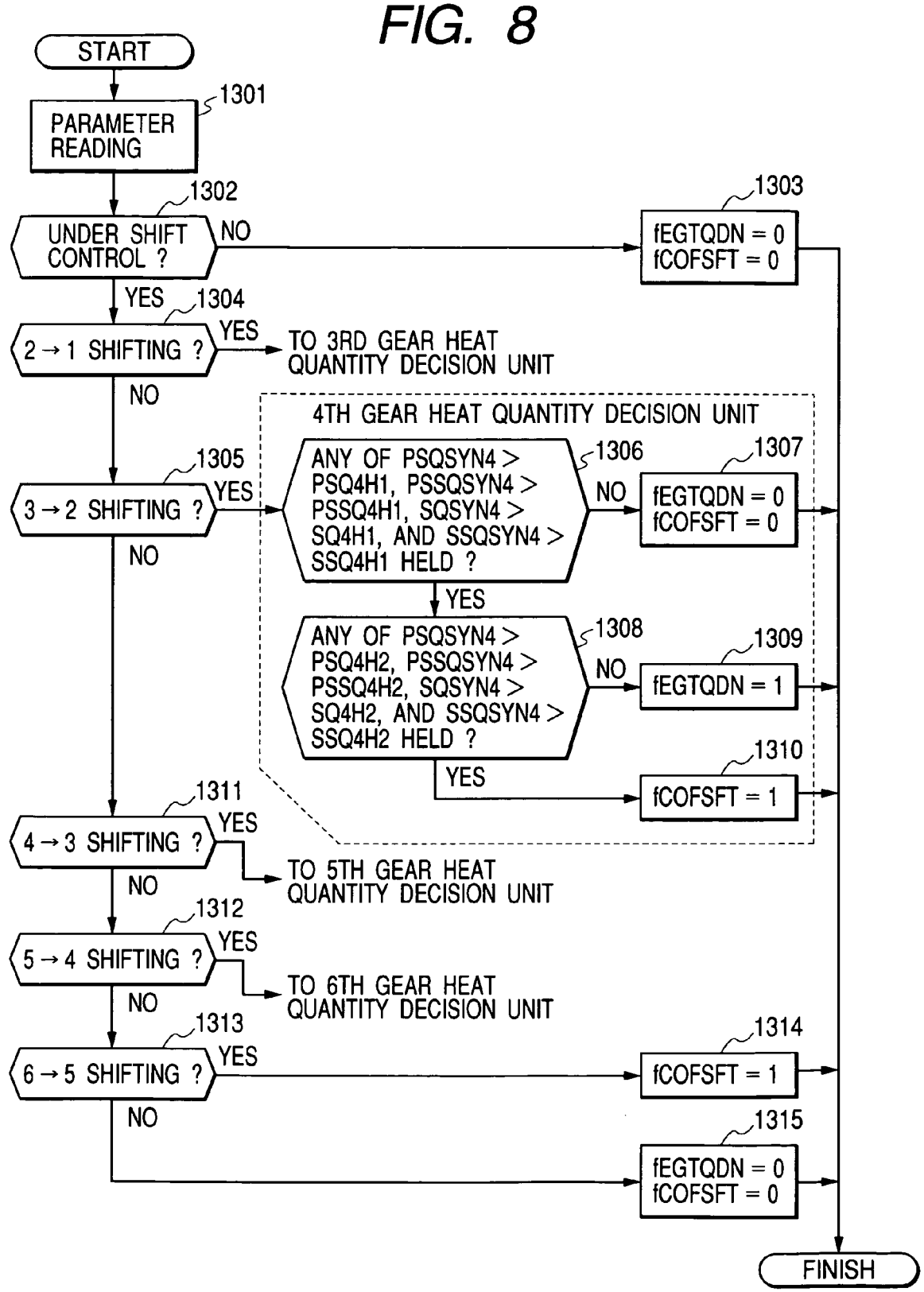
FIG. 8 is a flow chart showing processing contents of the decision flag calculation in the car control unit according to an embodiment of the present invention.

FIG. 8 is a flow chart showing processing contents of the decision flag calculation in the car control unit according to an embodiment of the present invention.

In this process, a case that at Step 1002 (the synchronizer selection process) shown in FIG. 5, only one synchronizer is selected, for example, in the example shown in FIG. 7, a case that at Step 1207 during shifting of 3-2, only the 4th gear synchronizer 54 is selected and the torque is transferred using the 4th gear synchronizer 54 is explained. Therefore, a case that using the 3rd gear synchronizer 53 during shifting of 2-1, using the 5th gear synchronizer 55 during shifting of 4-3, and using the 6th gear synchronizer 56 during shifting of 5-4, the torque is transferred during shifting is explained.

Firstly, at Step 1301, the power train control unit 100 reads the parameters to be used at Steps 1302 to 1315.

Next, at Step 1302, the power train control unit 100 decides whether the synchronizer is under shift control or not, and when the synchronizer is not under shift control, it goes to Step 1303, and when the synchronizer is under shift control, it goes to Step 1304.

When the synchronizer is not under shift control, at Step 1303, the power train control unit 100 clears the engine torque-down flag fEGTQDN and the clutch disengagement shift flag fCOFSFT. In this case, the engine torque-down flag fEGTQDN is a flag for deciding whether the torque of the engine 7 is to be controlled or not on the basis of the heat quantity inferred value calculated at Step 1001. Further, the clutch disengagement shift flag fCOFSFT is a flag for deciding whether or not to realize shifting by disengaging the clutch 8 on the basis of the heat quantity inferred value calculated at Step 1001.

When the synchronizer is under shift control, at Step 1304, the power train control unit 100 decides whether the shifting is shifting of 2-1 or not. When the shifting is shifting of 2-1, to shift the gear using the 3rd gear synchronizer 53, the power train control unit 100 goes to a 3rd gear heat quantity decision unit not shown in the drawing. The processing contents of the 3rd gear heat quantity decision unit are the same as those of a 4th gear heat quantity decision unit (at Steps 1306 to 1310) which will be described later.

When the shifting is not shifting of 2-1, at Step 1305, the power train control unit 100 decides whether the shifting is shifting of 3-2 or not. When it is shifting of 3-2, the power train control unit 100, to shift the gear using the 4th gear synchronizer 54, goes to the 4th gear heat quantity decision unit constituted as described at Steps 1306 to 1310.

The 4th gear heat quantity decision unit, at Step 1306, decides whether any of the conditions indicated by Formulas (3) to (6) given below is held or not.

4th gear expected heat quantity
PSQSYN4>PSQ4H1— (3)

4th gear expected accumulated heat quantity
PSSQSYN4>PSSQ4H1    (4)

4th gear heat quantity SQSYN4>SQ4H1    (5)

4th gear accumulated heat quantity
SSQSYN4>SSQ4H1    (6)

Here, PSQ4H1 is a preset expected heat quality threshold value 1, and PSSQ4H1 is a preset expected accumulated heat quality threshold value 1, and SQ4H1 is a preset heat quantity threshold value 1, and SSQ4H1 is a preset accumulated heat quantity threshold value 1.

When all the conditions of Formulas (3) to (6) are not held, the power train control unit 100 decides that the temperature of the 4th gear synchronizer 54 rises little and goes to Step 1307. And, at Step 1307, the power train control unit 100 clears the engine torque-down flag fEGTQDN and the clutch disengagement shift flag fCOFSFT and ends the processing.

When any of the conditions of Formulas (3) to (6) is held, at Step 1308, the power train control unit 100 decides whether any of the conditions indicated by Formulas (7) to (10) given below is held or not.

4th gear expected heat quantity PSQSYN4>PSQ4H2    (7)

4th gear expected accumulated heat quantity
PSSQSYN4>PSSQ4H2    (8)

4th gear heat quantity SQSYN4>SQ4H2    (9)

4th gear accumulated heat quantity
SSQSYN4>SSQ4H2    (10)

In this case, PSQ4H2 is a preset expected heat quality threshold value 2, and PSSQ4H2 is a preset expected accumulated heat quality threshold value 2, and SQ4H2 is a preset heat quantity threshold value 2, and SSQ4H2 is a preset accumulated heat quantity threshold value 2. The threshold values indicated in Formulas (3) to (10) are set so as to satisfy PSQ4H1<PSQ4H2, PSSQ4H1<PSSQ4H2, SQ4H1<SQ4H2, and SSQ4H1<SSQ4H2.

When all the conditions of Formulas (7) to (10) are not held, the power train control unit 100 decides that although the temperature of the 4th gear synchronizer 54 rises slightly much, by reducing the torque of the engine 7, the gear can be shifted and at Step 1309, it sets the engine torque-down flag fEGTQDN and ends the processing.

When any of the conditions of Formulas (7) to (10) is held, the temperature of the 4th gear synchronizer 54 rises hard and it is necessary to disengage the clutch 8 and realize shifting, so that at Step 1310, the power train control unit 100 sets the clutch disengagement shift flag fCOFSFT and ends the processing.

When it is decided in the process at Step 1305 that the shifting is not shifting of 3-2, at Step 1311, the power train control unit 100 decides whether the shifting is shifting of 4-3 or not. When the shifting is shifting of 4-3, to shift the gear using the 5th gear synchronizer 55, the power train control unit 100 goes to a 5th gear heat quantity decision unit not shown in the drawing. The processing contents of the 5th gear heat quantity decision unit are the same as those of the 4th gear heat quantity decision unit mentioned above.

When the shifting is not shifting of 4-3, at Step 1312, the power train control unit 100 decides whether the shifting is shifting of 5-4 or not. When the shifting is shifting of 5-4, to shift the gear using the 6th gear synchronizer 56, the power train control unit 100 goes to a 6th gear heat quantity decision unit not shown in the drawing. The processing contents of the 6th gear heat quantity decision unit are the same as those of the 4th gear heat quantity decision unit mentioned above.

When the shifting is not shifting of 5-4, at Step 1313, the power train control unit 100 decides whether the shifting is shifting of 6-5 or not. When the shifting is shifting of 6-5, to disengage the clutch 8 and realize shifting, at Step 1314, the power train control unit 100 sets the clutch disengagement shift flag fCOFSFT and ends the processing. When the shifting is not shifting of 6-5, at Step 1315, the power train control unit 100 clears the engine torque-down flag fEGTQDN and the clutch disengagement shift flag fCOFSFT and ends the processing.

Next, by referring to FIG. 9, Step 1004 (the target input shaft speed calculation) shown in FIG. 5 will be described in detail.

Figure 9:
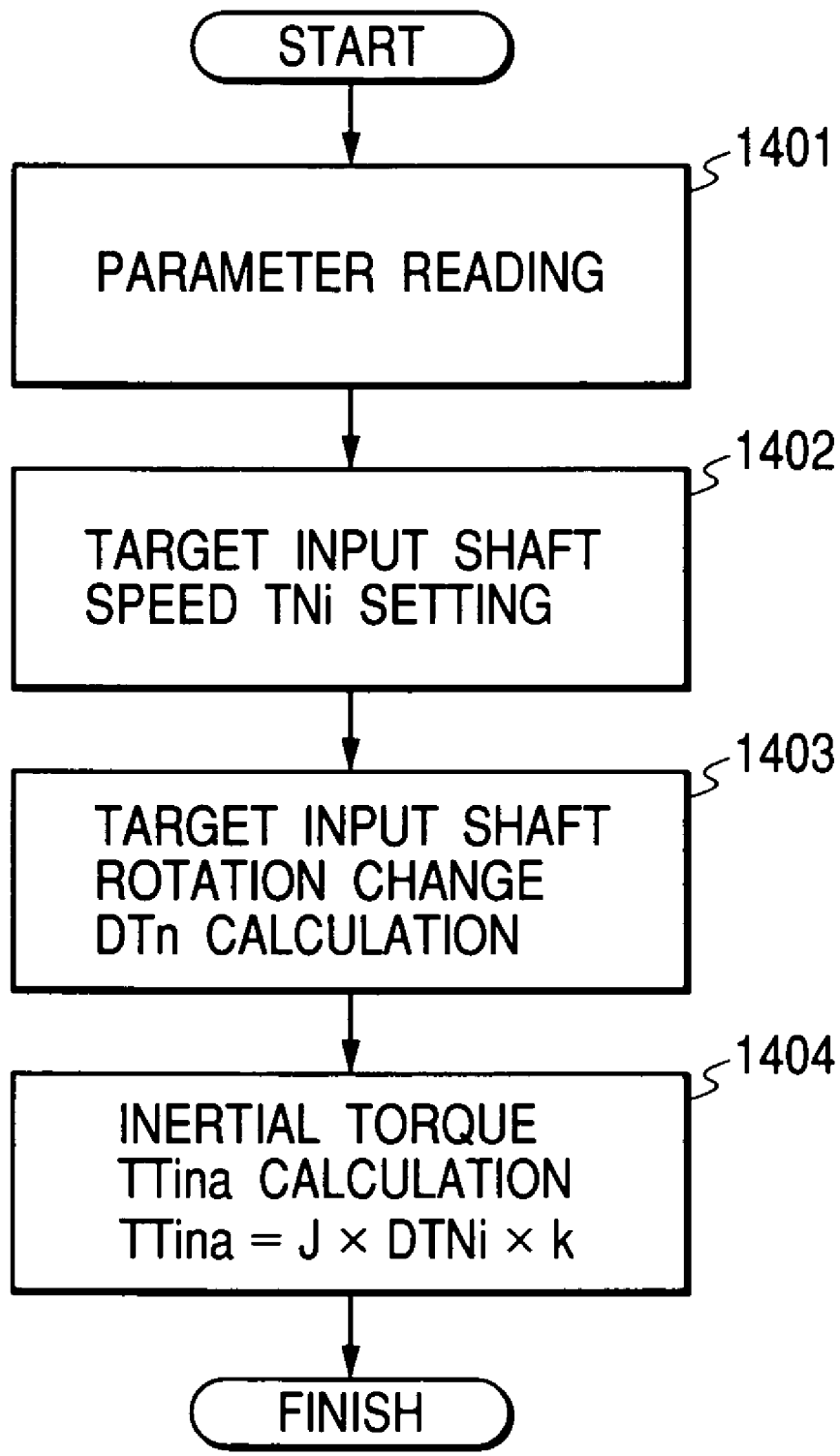
FIG. 9 is a flow chart showing processing contents of the target input shaft speed calculation in the car control unit according to an embodiment of the present invention.

FIG. 9 is a flow chart showing processing contents of the target input shaft speed calculation in the car control unit according to an embodiment of the present invention.

Firstly, at Step 1401, the power train control unit 100 reads the parameters to be used at Steps 1402 to 1404.

Next, at Step 1402, the power train control unit 100 sets the target input shaft speed TNi. The power train control unit 100 sets the target input shaft speed TNi during rotation synchronization from the shift pattern and output shaft speed so as to smoothly change the speed equivalent to the gear position before shifting to the speed equivalent to the gear position after shifting.

Next, at Step 1403, the power train control unit 100 calculates the change DTNi of the target input shaft speed TNi.

Finally, at Step 1404, the power train control unit 100 calculates the inertia torque TTina. Here, assuming the inertial factor from the engine to the input shaft as J and the unit conversion factor for converting the speed [r/min] to the angular speed [rad/s] as k, the inertia torque TTina is calculated from TTina=J×DTNi×k.

Next, by referring to FIG. 10, Step 1005 (the target assist torque calculation) shown in FIG. 5 will be described in detail.

Figure 10:
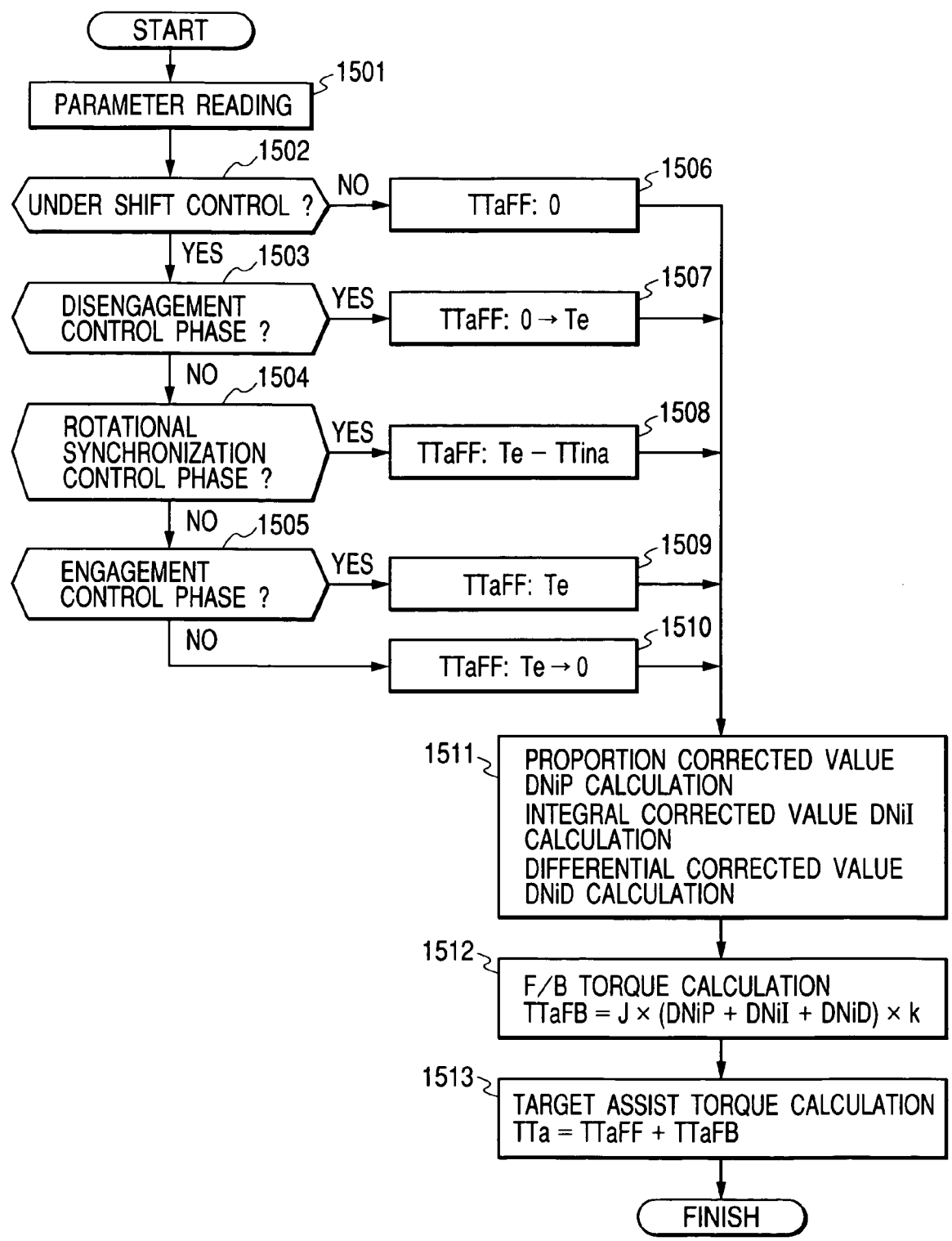
FIG. 10 is a flow chart showing processing contents of the target assist torque calculation in the car control unit according to an embodiment of the present invention.

FIG. 10 is a flow chart showing processing contents of the target assist torque calculation in the car control unit according to an embodiment of the present invention.

Firstly, at Step 1501, the power train control unit 100 reads the parameters to be used at Steps 1502 to 1513.

Next, at Step 1502, the power train control unit 100 decides whether the synchronizer is under shift control or not, and when the synchronizer is under shift control, it goes to Step 1503. When the synchronizer is not under shift control, at Step 1506, the power train control unit 100 goes to Step 1511 on the assumption that the target assist torque feedforward value TTaFF=0.

At Step 1503, the power train control unit 100 decides whether the synchronizer is in the disengagement control phase or not and when the synchronizer is not in the disengagement control phase, it goes to Step 1504. When the synchronizer is in the disengagement control phase, at Step 1507, the power train control unit 100 slowly brings the target assist torque feedforward value TTaFF close to the engine torque Te and goes to Step 1511.

At Step 1504, the power train control unit 100 decides whether the synchronizer is in the rotation synchronization control phase or not and when the synchronizer is not in the rotation synchronization control phase, it goes to Step 1504. When the synchronizer is in the rotation synchronization control phase, at Step 1508, the power train control unit 100 calculates the target assist torque feedforward value TTaFF as TTaFF=engine torque Te—inertia torque TTina and goes to Step 1511.

At Step 1505, the power train control unit 100 decides whether the synchronizer is in the engagement control phase or not, and when the synchronizer is in the engagement control phase, it goes to Step 1509, and when the synchronizer is not in the engagement control phase, it goes to Step 1510.

When the synchronizer is in the engagement control phase, at Step 1509, the power train control unit 100 calculates the target assist torque feedforward value TTaFF as TTaFF=engine torque Te and goes to Step 1511.

When the synchronizer is not in the engagement control phase, at Step 1510, the power train control unit 100 slowly brings the target assist torque feedforward value TTaFF close to 0 and goes to Step 1511.

Next, at Step 1511, the power train control unit 100 calculates the proportional correction value DNiP from the deviation between the target input shaft speed TNi and the input shaft speed Ni, calculates the integral correction value DNiI from the integral value of the deviation, and calculates the differential correction value DNiD from the differential value of the deviation.

Next, at Step 1512, the power train control unit 100 calculates the target assist torque feedback value TTaFB as TTaFB=J×(DNiP+DNiI+DNiD)×k.

Finally, at Step 1513, the power train control unit 100 adds the feedforward value set at Steps 1506 to 1510 and the feedback value calculated at Step 1512 and calculates the target assist torque TTa.

Next, by referring to FIG. 11, Step 1006 (the target shift load calculation) shown in FIG. 5 will be described in detail.

Figure 11:
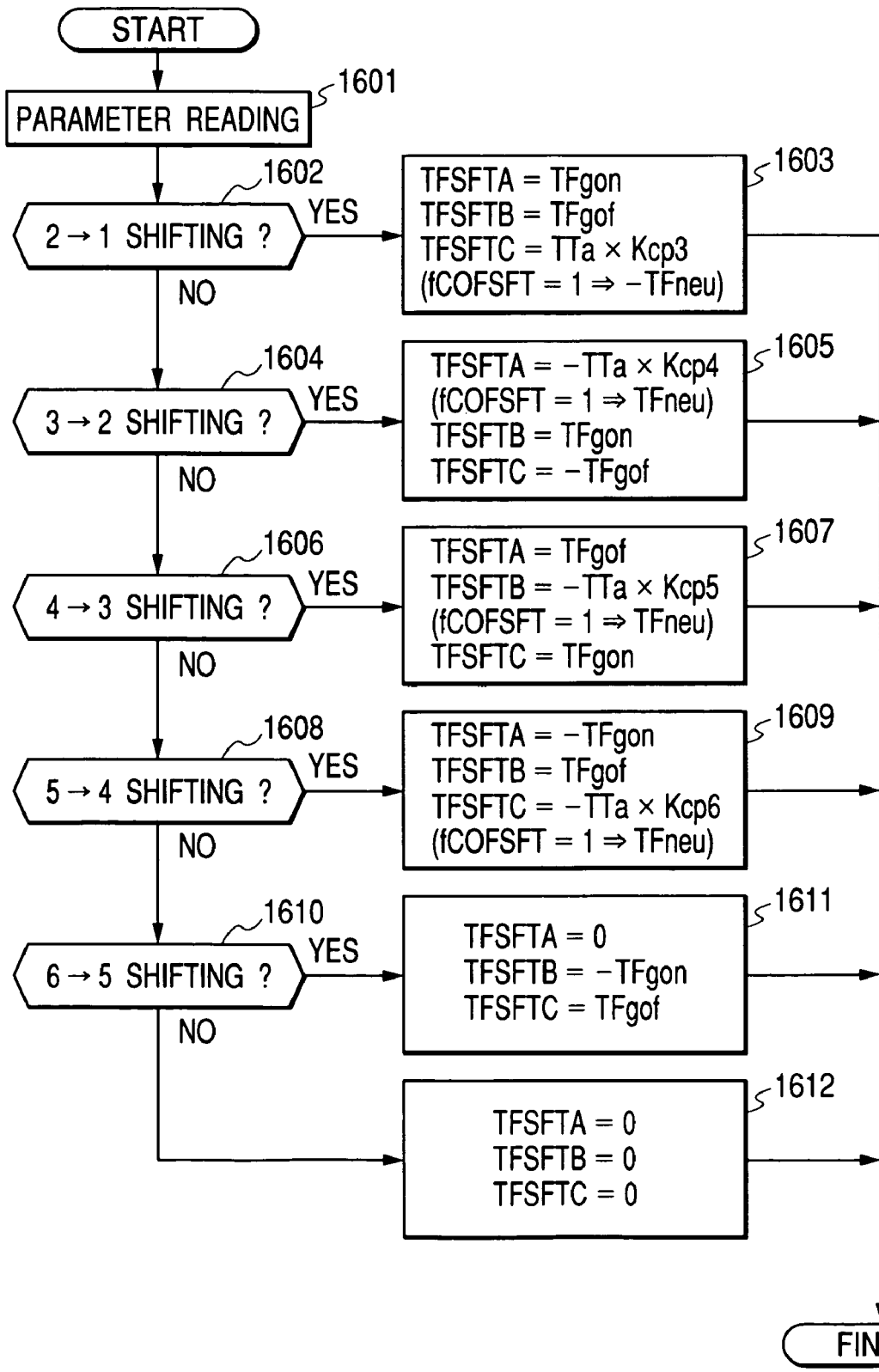
FIG. 11 is a flow chart showing processing contents of the target shift load calculation in the car control unit according to an embodiment of the present invention.

FIG. 11 is a flow chart showing processing contents of the target shift load calculation in the car control unit according to an embodiment of the present invention.

Firstly, at Step 1601, the power train control unit 100 reads the parameters to be used at Steps 1602 to 1612.

Next, at Step 1602, the power train control unit 100 decides whether the shifting is shifting of 2-1 or not and when the shifting is not shifting of 2-1, it goes to Step 1604. When the shifting is shifting of 2-1, the power train control unit 100 executes the 2-3-1 torque transfer of transferring the torque using the 3rd gear position.

And, at Step 1603, the power train control unit 100, to disengage the shift B from the 2nd gear, calculates the shift B target load TFSFTB as TFSFTB=−TFgof (disengagement load). Further, to engage the shift A with the 1st gear, the power train control unit 100 calculates the shift A target load TFSFTA as TFSFTA=TFgon (engagement load). Further, to transfer the torque during shifting by the synchronizer 53 at the 3rd gear position, the power train control unit 100 calculates the shift C target load TFSFTC as TFSFTC=TTa× Kcp3. In this case, Kcp3 indicates a factor for converting the torque to be transferred by the synchronizer 53 to the pressing load to the sleeve 23, which is calculated from the effective radius of the cone face of the synchronizer 53 and the gear 3, the coefficient of friction, and the number of cone faces. However, when the clutch disengagement shift flag fCOFSFT is set at Step 1003, the power train control unit 100 disengages the clutch 8 without transferring the torque during shifting and shifts the gear. Therefore, to control the shift C at the neutral position, the power train control unit 100 calculates the shift C target load TFSFTC as TFSFTC=− TFneu (neutral holding load).

At Step 1604, the power train control unit 100 decides whether the shifting is shifting of 3-2 or not, and when the shifting is not shifting of 3-2, it goes to Step 1606, and when the shifting is shifting of 3-2, it goes to Step 1605. When the shifting is shifting of 3-2, the power train control unit 100 executes the 3-4-2 torque transfer of transferring the torque using the 4th gear position.

And, at Step 1605, the power train control unit 100, to disengage the shift C from the 3rd gear, calculates the shift C target load TFSFTC as TFSFTC=TFgof (disengagement load). Further, to engage the shift B with the 2nd gear, the power train control unit 100 calculates the shift B target load TFSFTB as TFSFTB=TFgon (engagement load). Further, to transfer the torque during shifting by the synchronizer 54 at the 4th gear position, the power train control unit 100 calculates the shift A target load TFSFTA as TFSFTA=− TTa×Kcp4. In this case, Kcp4 indicates a factor for converting the torque to be transferred by the synchronizer 54 to the pressing load to the sleeve 21, which is calculated from the effective radius of the cone face of the synchronizer 54 and the gear 14, the coefficient of friction, and the number of cone faces. However, when the clutch disengagement shift flag fCOFSFT is set at Step 1003, the power train control unit 100 disengages the clutch 8 without transferring the torque during shifting and shifts the gear. Therefore, to control the shift A at the neutral position, the power train control unit 100 calculates the shift A target load TFSFTA as TFSFTA=TFneu (neutral holding load).

At Step 1606, the power train control unit 100 decides whether the shifting is shifting of 4-3 or not, and when the shifting is not shifting of 4-3, it goes to Step 1608, and when the shifting is shifting of 4-3, it goes to Step 1607. When the shifting is shifting of 4-3, the power train control unit 100 executes the 4-5-3 torque transfer using the 5th gear position.

And, at Step 1607, the power train control unit 100, to disengage the shift A from the 4th gear, calculates the shift A target load TFSFTA as TFSFTA=TFgof (disengagement load). Further, to engage the shift C with the 3rd gear, the power train control unit 100 calculates the shift C target load TFSFTC as TFSFTC=TFgon (engagement load). Further, to transfer the torque during shifting by the synchronizer 55 at the 5th gear position, the power train control unit 100 calculates the shift B target load TFSFTB as TFSFTB=− TTa×Kcp5. In this case, Kcp5 indicates a factor for converting the torque to be transferred by the synchronizer 55 to the pressing load to the sleeve 22, which is calculated from the effective radius of the cone face of the synchronizer 55 and the gear 5, the coefficient of friction, and the number of cone faces. However, when the clutch disengagement shift flag fCOFSFT is set at Step 1003, the power train control unit 100 disengages the clutch 8 without transferring the torque during shifting and shifts the gear. Therefore, to control the shift B at the neutral position, the power train control unit 100 calculates the shift B target load TFSFTB as TFSFTB=TFneu (neutral holding load).

At Step 1608, the power train control unit 100 decides whether the shifting is shifting of 5-4 or not, and when the shifting is not shifting of 5-4, it goes to Step 1610, and when the shifting is shifting of 5-4, it goes to Step 1609. When the shifting is shifting of 5-4, the power train control unit 100 executes the 5-6-4 torque transfer using the 6th gear position.

And, at Step 1609, the power train control unit 100, to disengage the shift B from the 5th gear, calculates the shift B target load TFSFTB as TFSFTB=TFgof (disengagement load). Further, to engage the shift A with the 4th gear, the power train control unit 100 calculates the shift A target load TFSFTA as TFSFTA=−TFgon (engagement load). Further, to transfer the torque during shifting by the synchronizer 56 at the 6th gear position, the power train control unit 100 calculates the shift C target load TFSFTC as TFSFTC=−TTa×Kcp6. In this case, Kcp6 indicates a factor for converting the torque to be transferred by the synchronizer 56 to the pressing load to the sleeve 23, which is calculated from the effective radius of the cone face of the synchronizer 56 and the gear 6, the coefficient of friction, and the number of cone faces. However, when the clutch disengagement shift flag fCOFSFT is set at Step 1003, the power train control unit 100 disengages the clutch 8 without transferring the torque during shifting and shifts the gear. Therefore, to control the shift C at the neutral position, the power train control unit 100 calculates the shift C target load TFSFTC as TFSFTC=TFneu (neutral holding load).

At Step 1610, the power train control unit 100 decides whether the shifting is shifting of 6-5 or not, and when the shifting is not shifting of 6-5, at Step 1612, it sets the shift A target load TFSFTA, the shift B target load TFSFTB, and the shift C target load TFSFTC respectively to 0. When the shifting is shifting of 6-5, at Step 1611, the power train control unit 100, to disengage the clutch 8 without transferring the torque during shifting and shift the gear, sets the shift A target load TFSFTA=0. Further, the power train control unit 100 calculates the shift C target load TFSFTC as TFSFTC=TFgof (disengagement load) to disengage the shift C from the 6th gear and calculates the shift A target load TFSFTA as TFSFTA=−TFgon (engagement load) to engage the shift A with the 4th gear.

Next, by referring to FIG. 12, Step 1007 (the target clutch position calculation) shown in FIG. 5 will be described in detail.

Figure 12:
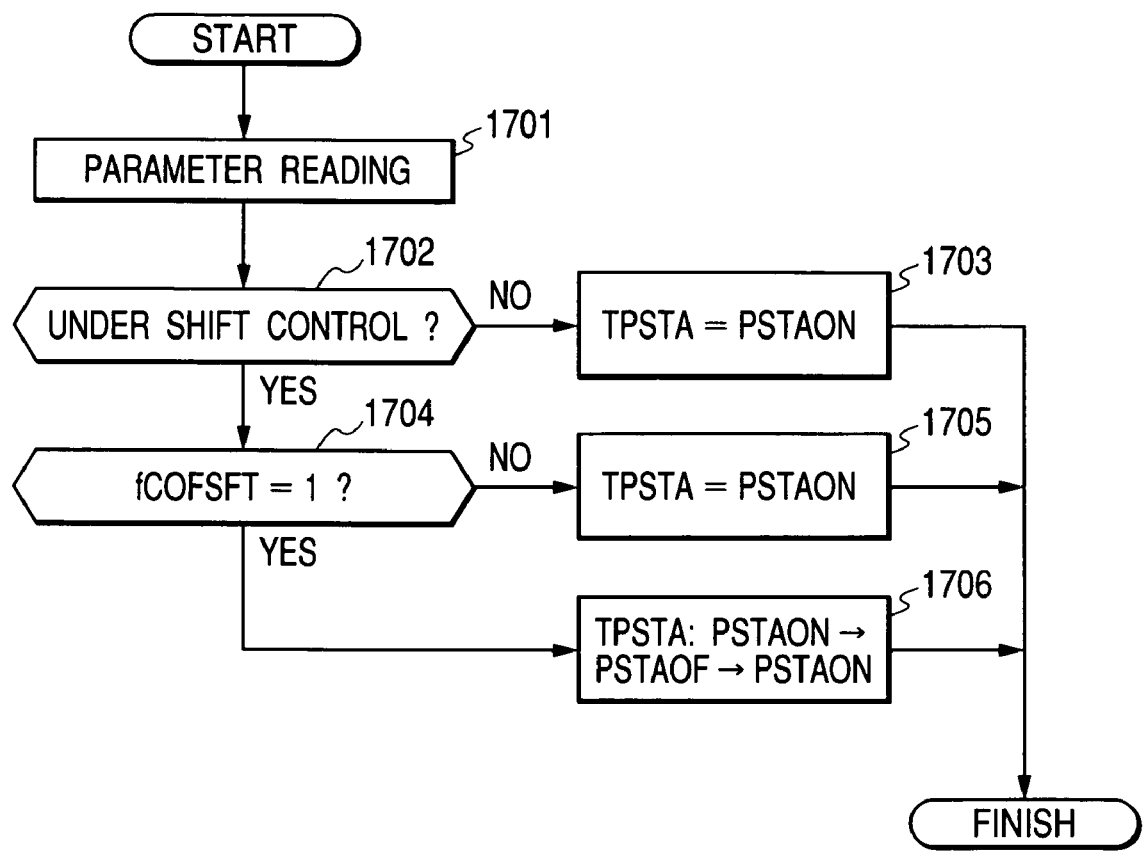
FIG. 12 is a flow chart showing processing contents of the target clutch position calculation in the car control unit according to an embodiment of the present invention.

FIG. 12 is a flow chart showing processing contents of the target clutch position calculation in the car control unit according to an embodiment of the present invention. Firstly, at Step 1701, the power train control unit 100 reads the parameters to be used at Steps 1702 to 1706. Next, at Step 1702, the power train control unit 100 decides whether the synchronizer is under shift control or not, and when the synchronizer is not under shift control, it goes to Step 1703 and calculates the clutch target position TPSTA as TPSTA=PSTAON (engagement position).

When the synchronizer is under shift control, the power train control unit 100 goes to Step 1704 and decides whether the clutch disengagement shift flag fCOFSFT is set or not. When the clutch disengagement shift flag fCOFSFT is not set, the power train control unit 100 goes to Step 1705 and when the clutch disengagement shift flag fCOFSFT is set, it goes to Step 1706.

When the clutch disengagement shift flag fCOFSFT is not set, at Step 1705, the power train control unit 100 calculates the clutch target position TPSTA as TPSTA=PSTAON (engagement position).

When the clutch disengagement shift flag fCOFSFT is set, at Step 1706, the power train control unit 100 disengages the clutch 8 and shifts the gear. Firstly, the power train control unit 100 lowers the clutch target position TPSTA down to PSTAOF (disengagement position) and shifts the gear in the state that the clutch 8 is disengaged. After end of shifting, the power train control unit 100 slowly raises the clutch target position TPSTA up to PSTAON (engagement position) and engages the clutch.

Next, by referring to FIG. 13, Step 1008 (the target engine torque calculation) shown in FIG. 5 will be described in detail.

Figure 13:
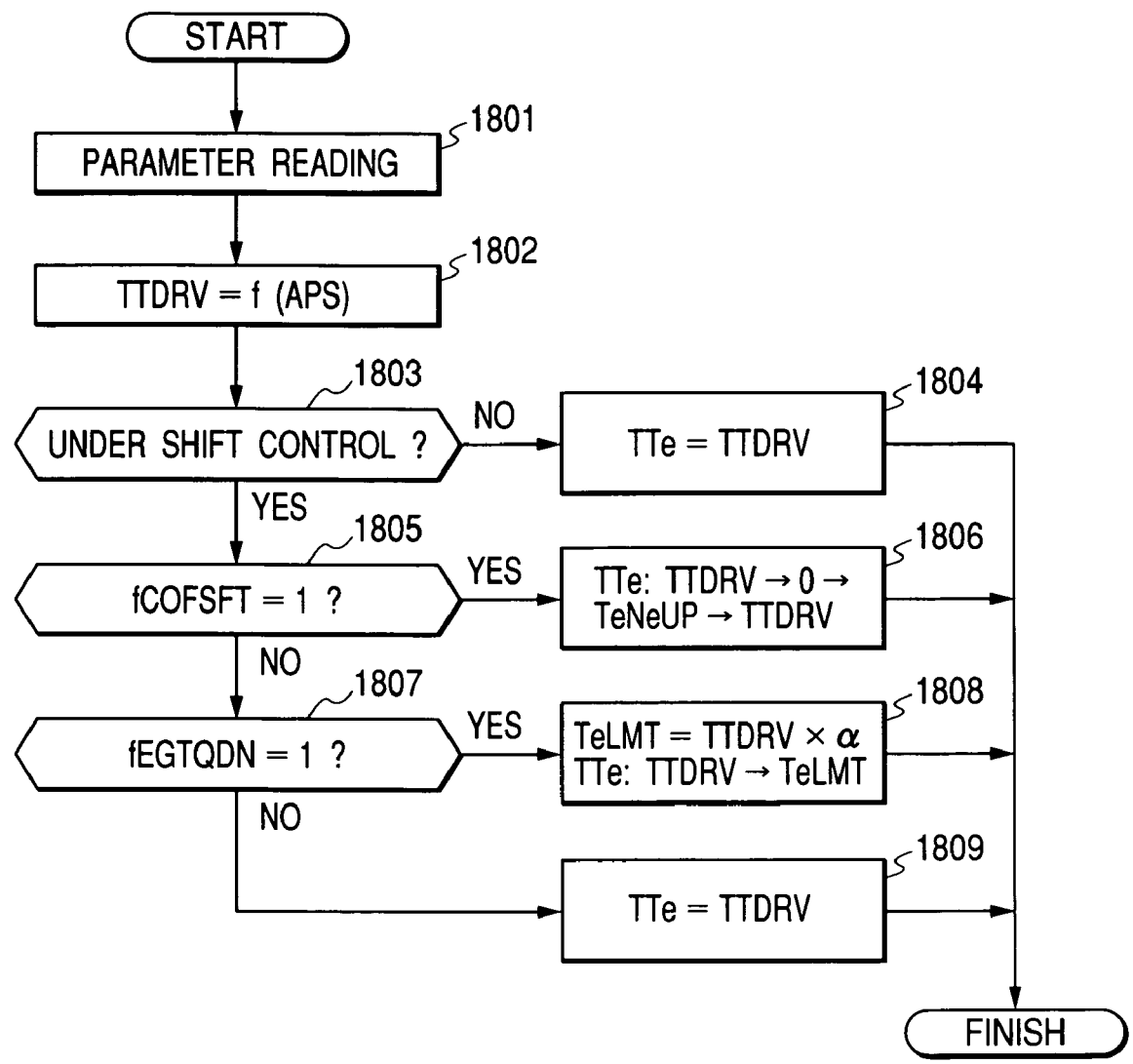
FIG. 13 is a flow chart showing processing contents of the target engine torque calculation in the car control unit according to an embodiment of the present invention.

FIG. 13 is a flow chart showing processing contents of the target engine torque calculation in the car control unit according to an embodiment of the present invention. Firstly, at Step 1801, the power train control unit 100 reads the parameters to be used at Steps 1802 to 1809.

Next, at Step 1802, the power train control unit 100 calculates the driver request torque TTDRV by the function f on the basis of the accelerator opening APS. In this case, the driver request torque TTDRV is engine torque requested by a driver and it may be decided by a map based on the accelerator opening APS.

Next, at Step 1803, the power train control unit 100 decides whether the synchronizer is under shift control or not, and when the synchronizer is not under shift control, it goes to Step 1804, and when the synchronizer is under shift control, it goes to Step 1805.

When the synchronizer is not under shift control, at Step 1804, the power train control unit 100 calculates the target engine torque TTe as TTe=TTDRV (driver request torque).

When the synchronizer is under shift control, at Step 1805, the power train control unit 100 decides whether the clutch disengagement shift flag fCOFSFT is set or not, and when the clutch disengagement shift flag fCOFSFT is set, it goes to Step 1806, and when the clutch disengagement shift flag fCOFSFT is not set, it goes to Step 1807.

When the clutch disengagement shift flag fCOFSFT is set, at Step 1806, the power train control unit 100 calculates the target engine torque TTe for disengaging the clutch 8 and shifting the gear. Firstly, the power train control unit 100 disengages the clutch 8 and slowly reduces the target engine torque TTe down to 0. After disengaging the clutch 8, to increase the engine speed Ne, the power train control unit 100 sets the target engine torque to TeNeUP (torque in correspondence to a rise in the engine speed). And, after end of shifting, the power train control unit 100 engages the clutch 8 and slowly returns the target engine torque TTe to the driver request torque TTDRV.

When the clutch disengagement shift flag fCOFSFT is not set, at Step 1807, the power train control unit 100 decides whether the engine torque-down flag fEGTQDN is set or not, and when the engine torque-down flag fEGTQDN is not set, it goes to Step 1809, and when the engine torque-down flag fEGTQDN is set, it goes to Step 1808.

When the engine torque-down flag fEGTQDN is not set, at Step 1809, the power train control unit 100 calculates the target engine torque TTe as TTe=TTDRV (driver request torque).

When the engine torque-down flag fEGTQDN is set, at Step 1808, the power train control unit 100 controls the torque of the engine 7 so as to enable torque transfer during shifting by the synchronizer. Firstly, the power train control unit 100 calculates the upper limit value of the engine torque TeLMT as TeLMT=TTDRV×α(0≦α≦1). Here, the factor α is a factor for setting the upper limit value, which is set on the basis of the heat quantity inferred value of the synchronizer. And, the power train control unit 100 slowly lowers the target engine torque TTe down to the upper limit value of the engine torque TeLMT, thereby lowers the torque of the engine 7.

As explained above, by the control methods shown in FIGS. 4 to 13, the heat quantity of the synchronizer is inferred and according to the heat quantity inferred values, various control methods can be realized such as (a) of selecting a synchronizer forming the torque transfer path (intermediate transfer path) during shifting (Steps 1207 and 1208 shown in FIG. 7), of lowering the torque of the engine 7 at the time of shifting (Step 1309 shown in FIG. 8 and Step 1808 shown in FIG. 13), and (c) of switching the mode (the first shift mode) for forming the torque transfer path and shifting the gear by the synchronizer and the mode (the second shift mode) for disengaging the clutch 8 and shifting the gear (Step 1310 shown in FIG. 8 and Step 1706 shown in FIG. 12).

Further, in the embodiments shown in FIGS. 4 to 13, the heat quantity inferred value is used as a parameter indicating the state of the frictional surface of the synchronizer, However, the temperature of the frictional surface detected by a temperature sensor not shown in the drawing may be used and the temperature inferred value calculated on the basis of the heat quantity inferred value of the synchronizer may be used. Further, the heat quantity inferred value may be used as a parameter of detecting the balk position of the synchronizer mechanism from a signal of the position sensor for detecting the stroke of the sleeve and indicating the state of the abrasion loss of the synchronizer calculated on the basis of the detected balk position.

Next, by referring to FIGS. 14 to 17, at the time of down-shift (3rd gear→2nd gear), at Step 1208 shown in FIG. 7, the shift control by the 3-4-6-2 torque transfer of transferring the torque by the 4th gear and 6th gear positions will be explained.

Here, by referring to FIGS. 14 to 16, the shift principle of shift control by the 3-4-6-2 torque transfer will be explained.

Figure 14:
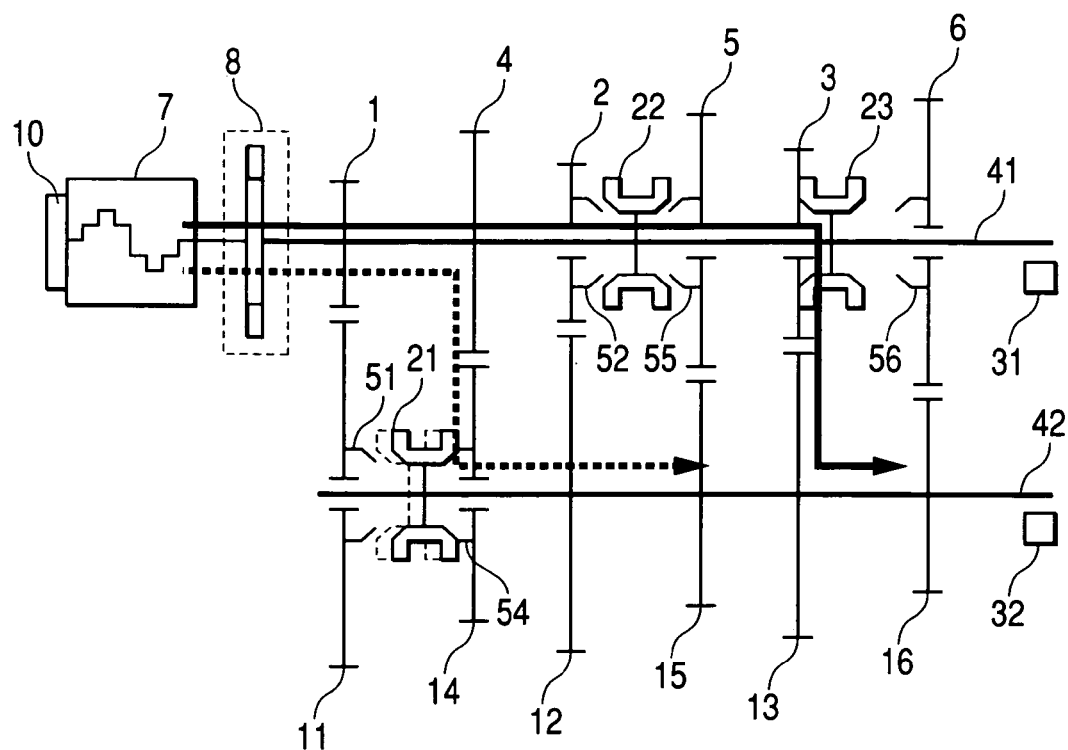
FIG. 14 is an operation diagram under shift control by the 3-4-6-2 torque transfer in the car control unit according to an embodiment of the present invention.
Figure 15:
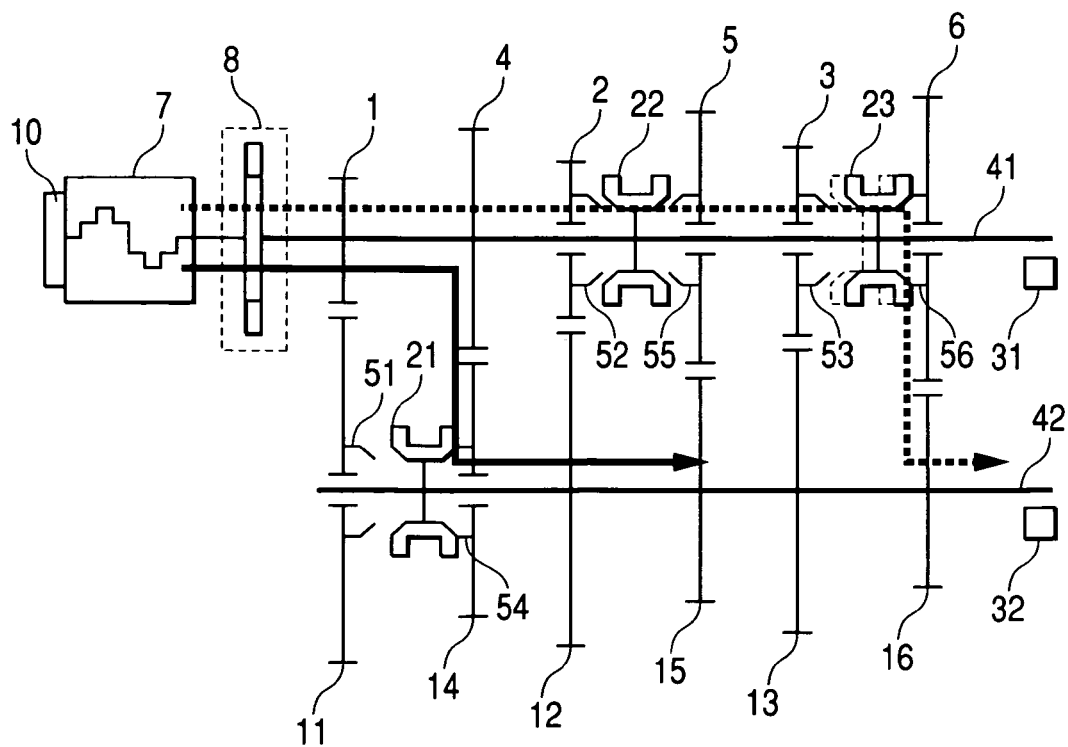
FIG. 15 is an operation diagram under shift control by the 3-4-6-2 torque transfer in the car control unit according to an embodiment of the present invention.
Figure 16:
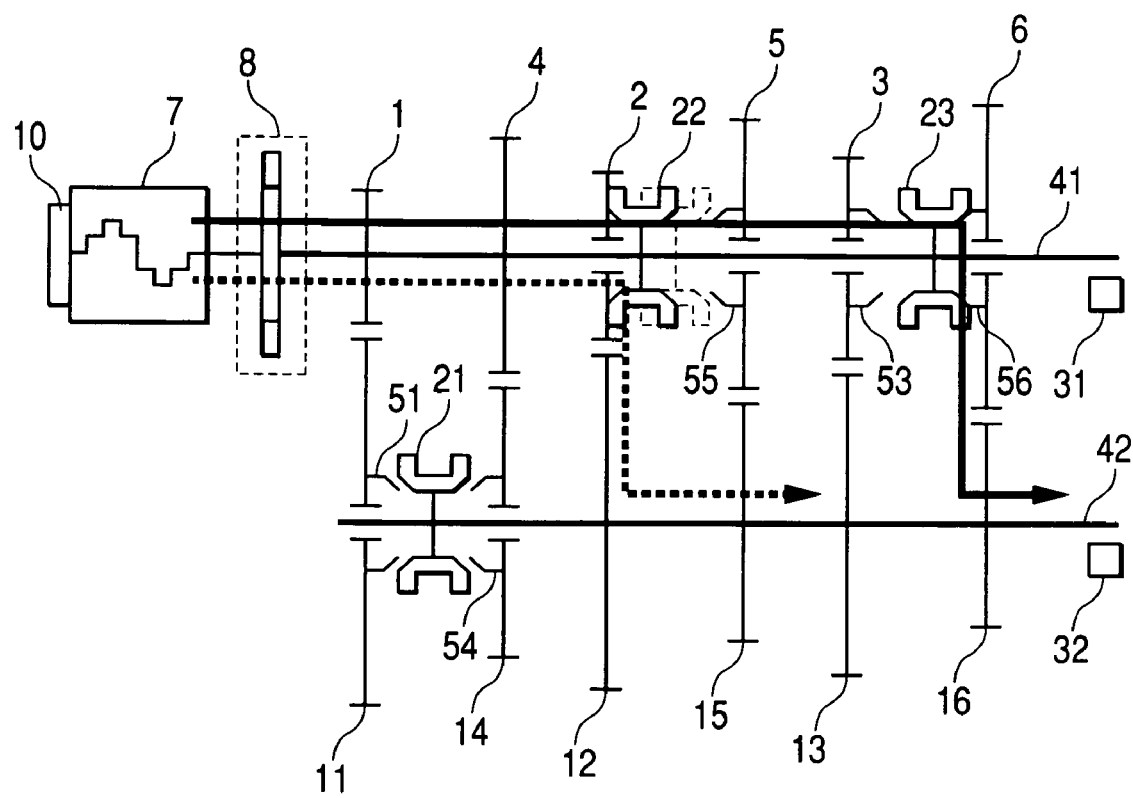
FIG. 16 is an operation diagram under shift control by the 3-4-6-2 torque transfer in the car control unit according to an embodiment of the present invention.

FIGS. 14 to 16 are operation diagrams under shift control by the 3-4-6-2 torque transfer in the car control unit according to an embodiment of the present invention. Further, the same numerals as those shown in FIG. 1 indicate the same parts.

FIG. 14 shows an operation example when the transfer path (the 3rd gear transfer path) formed by the connection of the gear 3 and shift A is switched to the transfer path (the 4th gear synchronic transfer path) formed by the synchronizer 54 of the 4th gear. Further, in the drawing, the 3rd gear transfer path is a path indicated by a solid line arrow and the 4th gear synchronic transfer path is a path indicated by a dashed line.

The torque transfer path of the engine 7 during 3rd gear running is engine 7→clutch 8→input shaft 41→sleeve 23→gear 3→gear 13→output shaft 42. After a shift instruction of down-shift (3rd gear→2nd gear) is generated, the shift control immediately starts. Then, the synchronizer selection means 302 shown in FIG. 3 selects the synchronizer 54 of the 4th gear.

During 3rd gear running, the gear 3 and the sleeve 23 are engaged perfectly, so that a speed difference is generated between sleeve 21 and the gear 14 and the torque transfer by the synchronizer 54 of the 4th gear is enabled. Therefore, by increasing the pressing load to the sleeve 21, the torque transferred by the 3rd gear transfer path can be slowly transferred to the 4th gear synchronic transfer path. When the pressing load to the sleeve 21 reaches a predetermined value, the torque transferred by the 3rd gear transfer path is reduced almost to 0 and the sleeve 23 engaged to the gear 3 can be disengaged.

By use of the synchronizer 54 like this, the connection of the gear 3 and shift A can be disengaged in the state that the clutch 8 is engaged. After the sleeve 23 engaged to the gear 3 is disengaged, by the transfer path (the 4th gear synchronic transfer path) formed by the synchronizer 54 of the 4th gear, the torque of the engine 7 is transferred to the output shaft 42. At this time, the torque transfer path of the engine 7 is engine 7→clutch 8→input shaft 41 gear 4→gear 14→synchronizer 54 sleeve 21→output shaft 42.

FIG. 15 is an operation diagram when the transfer path (the 4th gear synchronic transfer path) formed by the synchronizer 54 of the 4th gear is switched to the transfer path (the 6th gear synchronic transfer path) formed by the synchronizer 56 of the 6th gear. Further, in the drawing, the 4th gear synchronic transfer path is a path indicated by a solid line arrow and the 6th gear synchronic transfer path is a path indicated by a dashed line.

When a predetermined time elapses after the transfer path (the 3rd gear transfer path) formed by the connection of the gear 3 and shift A is switched to the transfer path formed by the synchronizer 54 of the 4th gear, the synchronizer selection means 302 shown in FIG. 3 is selected by the synchronizer 56 of the 6 gear and the synchronizer 54 of the 4th gear is switched to the synchronizer 56 of the 6th gear.

At this time, the speed of the input shaft 41 is controlled so as to be set to the speed equivalent to the 2nd gear (the speed of the gear 2), so that a speed difference is generated between sleeve 23 and the gear 6 and the torque transfer by the synchronizer 56 of the 6th gear is enabled. Therefore, by slowly increasing the pressing load to the sleeve 23 and slowly decreasing the pressing load to the sleeve 21, the torque transferred by the 4th synchronic gear transfer path can be slowly transferred to the 6th gear synchronic transfer path. When the pressing load to the sleeve 21 reaches almost 0, the torque transfer only by the 6th gear synchronic transfer path is enabled. At this time, the torque transfer path of the engine 7 is engine 7→clutch 8→input shaft 41→sleeve 23→synchronizer 56→gear 6→gear 16→output shaft 42.

FIG. 16 is an operation diagram when the transfer path (the 6th gear synchronic transfer path) formed by the synchronizer 56 of the 6th gear is switched to the transfer path (the 2nd gear transfer path) formed by the gear 2 and shift B. Further, in the drawing, the 6th gear synchronic transfer path is a path indicated by a solid line arrow and the 2nd gear transfer path is a path indicated by a dashed line.

When the speed of the input shaft 41 reaches the speed equivalent to the 2nd gear (the speed of the gear 2) after the transfer path (the 4th gear synchronic transfer path) formed by the synchronizer 54 of the 4th gear is switched to the transfer path formed by the synchronizer 56 of the 6th gear, the gear 2 is connected to the sleeve 22. Further, to prevent changing of the speed when the sleeve 22 passes, the pressing load to the sleeve 23 is adjusted, thus the speed of the input shaft 41 is kept at the speed equivalent to the 2nd gear (the speed of the gear 2) by the synchronizer 56 of the 6th gear. Therefore, until the sleeve 22 is perfectly engaged to the gear 2, it is necessary to continue the torque transfer by the synchronizer 56 of the 6th gear.

When the pressing load to the sleeve 23 is slowly reduced after the sleeve 22 is perfectly engaged to the gear 2, the torque transferred by the 6th synchronic gear transfer path can be transferred to the 2nd gear transfer path. When the pressing load to the sleeve 23 reaches almost 0, the torque transfer only by the 2nd gear transfer path is enabled. At this time, the torque transfer path of the engine 7 is engine 7→clutch 8→input shaft 41→sleeve 22→gear 2→gear 12→output shaft 42.

Next, by referring to FIG. 17, the shifting operation during down-shift (3rd gear→2nd gear) will be explained. Here, as explained in FIGS. 14 to 16, the two synchronizeres are switched like 3rd gear transfer path→4th gear synchronic transfer path→6th gear synchronic transfer path→2nd gear transfer path and a torque transfer during shifting is realized.

Figure 17:
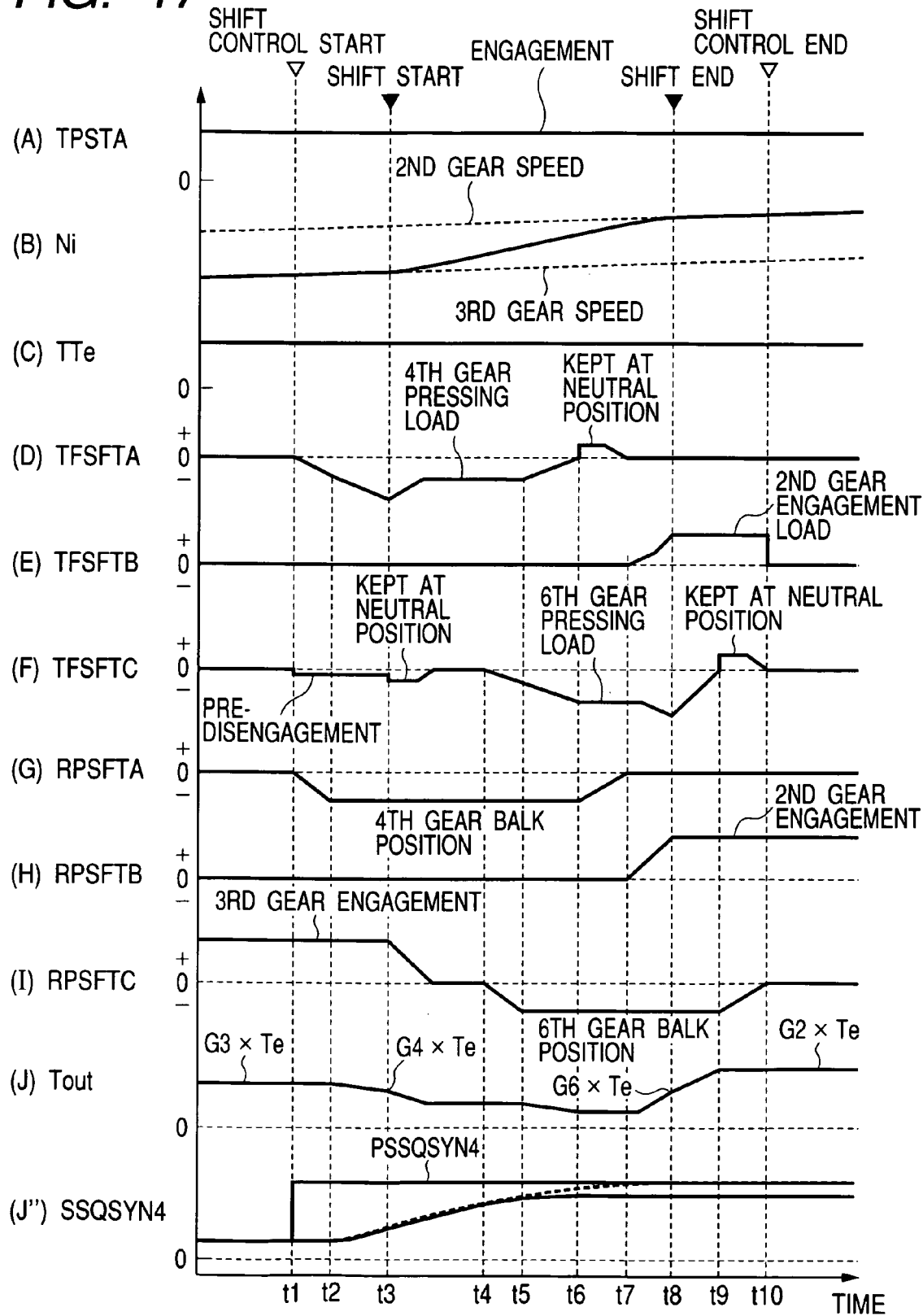
FIG. 17 is a time chart under shift control by the 3-4-6-2 torque transfer in the car control unit according to an embodiment of the present invention.

FIG. 17 is a time chart under shift control by the 3-4-6-2 torque transfer in the car control unit according to an embodiment of the present invention. The axis of abscissa shown in FIG. 17 indicates the time. The time from t1 to t3 corresponds to the operation under the disengagement control at Step 903 shown in FIG. 9. The time from t3 to t8 corresponds to the operation under the rotation synchronization control at Step 905 shown in FIG. 9. The time from t8 to t9 corresponds to the operation under the engagement control at Step 907 shown in FIG. 9. The time from t9 to t10 corresponds to the operation under the shift end control at Step 909 shown in FIG. 9.

Further, the axis of ordinate shown in FIG. 17 indicates the target clutch position TPSTA in FIG. 17(A), the input shaft speed Ni in FIG. 17(B), the target engine torque TTe in FIG. 17(C), the target shift A load TFSFTA in FIG. 17(D), the target shift B load TFSFTB in FIG. 17(E), the target shift C load TFSFTC in FIG. 17(F), the shift A position RPSFTA in FIG. 17(G), the shift B position RPSFTB in FIG. 17(H), the shift C position RPSFTC in FIG. 17(I), the output shaft torque Tout in FIG. 17(J), and the 4th gear synchronic accumulated heat quantity SSQSYN4 and the 4th gear synchronic expected accumulated heat quantity PSSQSYN4 in FIG. 17 (J"). The 4th gear synchronic expected accumulated heat quantity PSSQSYN4 is an inferred value of heat quantity expected to be accumulated by the synchronizer 54 in the next shifting.

In this case, in the target shift A load TFSFTA shown in FIG. 17(D) and the shift A position RPSFTA shown in FIG. 17(G), the 1st gear direction indicates a positive value and the 4th gear direction indicates a negative value. In the target shift B load TFSFTB shown in FIG. 17(E) and the shift B position RPSFTB shown in FIG. 17(H), the 2nd gear direction indicates a positive value and the 5th gear direction indicates a negative value. In the target shift C load TFSFTC shown in FIG. 17(F) and the shift C position RPSFTC shown in FIG. 17(I), the 3rd gear direction indicates a positive value and the 6th gear direction indicates a negative value. In the shift A position RPSFTA in FIG. 17(G), the shift B position RPSFTC in FIG. 17(H), and the shift C position RPSFTC in FIG. 17(I), the neutral position is 0. The running condition is that the accelerator opening is fixed and a shift instruction of down-shift (3rd gear→2nd gear) is generated.

When a shift instruction is issued at the time t1 and the shift control is started, the synchronizer 54 of the 4th gear is selected by the synchronizer selection means 302 shown in FIG. 3. And, by the processes at Step 1507 shown in FIG. 10 and Step 1605 shown in FIG. 11, as shown in FIG. 17(D), the target shift A load TFSFTA is slowly increased on the negative side. Further, by the process at Step 1605 shown in FIG. 11, as shown in FIG. 17(F), the target shift C load TFSFTC is set to a small value (pre-disengagement) on the negative side, and when the torque transferred by the 3rd gear transfer path becomes almost 0, the sleeve 23 is set up to be disengaged immediately.

At the time t2, the torque is slowly transferred from the 3rd gear transfer path to the 4th gear synchronic transfer path and as shown in FIG. 17(J), the output shaft torque Tout is also reduced slowly.

At the time t3, the torque transferred by the 3rd gear transfer path becomes almost 0 and the output shaft torque Tout is set to G4×Te. Here, G4 indicates a reduction ratio of the 4th gear. When the torque transferred by the 3rd gear transfer path becomes almost 0, the sleeve 23 is disengaged from the gear 3 under the pre-disengagement control of the shift C and the torque of the engine 7 is transferred to the output shaft by the 4th gear synchronic transfer path.

After the sleeve 23 is disengaged from the gear 3 at the time t3, to keep the sleeve 23 at the neutral position, as shown in FIG. 17(F), the target shift C load TFSFTC is set to a predetermined value on the negative side. After switched to the 4th gear synchronic transfer path, so as to allow the input shaft speed Ni to follow a desired speed track, as shown in FIG. 17(D), the target shift A load TFSFTA is set.

Thereafter, the synchronizer 56 of the 6th gear is selected by the synchronizer selection means 302 shown in FIG. 3 and the 4th gear synchronic transfer path is switched to the 6th gear synchronic transfer path. Therefore, at the time t4, as shown in FIG. 17(F), the target shift C load TFSFTC is slowly increased on the negative side.

At the time t5, when the shift C position RPSFTC reaches the position (hereinafter, referred to as the 6th gear balk position) where the synchronizer 56 starts the torque transfer, to transfer the torque of the engine 7 from the synchronizer 56, as shown in FIG. 17(D), the target shift A load TFSFTA is slowly returned to 0, and as shown in FIG. 17(F), the target shift C load TFSFTC is slowly increased on the negative side. By doing this, the torque is slowly transferred from the 4th gear synchronic transfer path to the 6th gear synchronic transfer path and as shown in FIG. 17(J), the output shaft torque Tout is also lowered slowly.

When the target shift A load TFSFTA is reduced to 0 at the time t6, the torque transferred by the 4th gear synchronic transfer path becomes almost 0. When the 4th gear synchronic transfer path is switched to the 6th gear synchronic transfer path and the torque during shifting is transferred like this, the heat quantity generated in the synchronizer 54 is not increased, and as shown by a solid line in FIG. 17(J"), the 4th gear synchronic accumulated heat quantity SSQSYN4 is prevented from increasing, and the 4th gear synchronic accumulated heat quantity SSQSYN4 becomes smaller than the 4th gear synchronic expected accumulated heat quantity PSSQSYN4.

Figure 18:
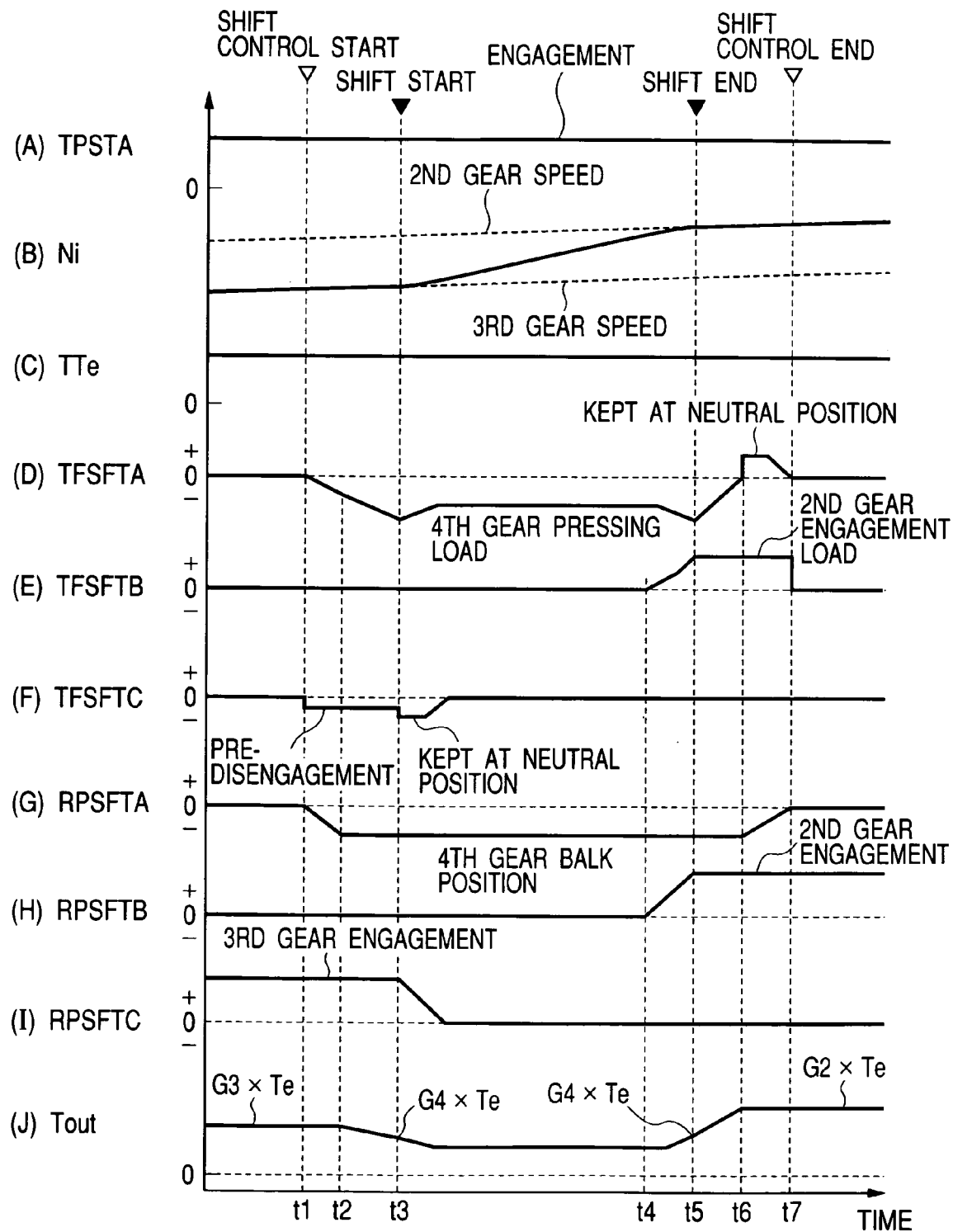
FIG. 18 is a time chart under shift control by the 3-4-2 torque transfer in the car control unit according to an embodiment of the present invention.

Further, the one shown by a dashed line in FIG. 17(J") is the 4th gear synchronic accumulated heat quantity SSQSYN4 when the 3-4-2 torque transfer, which will be described later in FIG. 18, is carried out. Compared with it, the 4th gear synchronic accumulated heat quantity SSQSYN4 shown by the solid line in this example becomes small. As a result, a sudden temperature rise of the frictional surface of the synchronizer 54 can be prevented beforehand and the abrasion of the synchronizer 54 can be suppressed.

After switched to the 6th gear synchronic transfer path, so as to allow the input shaft speed Ni to follow a desired speed track, as shown in FIG. 17(F), the target shift C load TFSFTC is set. Thereafter, the sleeve 21 moves from the position (hereinafter, referred to as the 4th gear balk position) where the synchronizer 54 starts torque transfer to the neutral position, so that as shown in FIG. 17(D), the target shift A load TFSFTA is set to a predetermined value (kept at the neutral position) on the positive side.

Thereafter, at the time t7, as shown in FIG. 17(E), the target shift B load TFSFTB is slowly increased on the positive side and the sleeve 22 is moved. When the input shaft speed Ni approaches the speed equivalent to the 2nd gear (the speed of the gear 2), the target shift B load TFSFTB is increased up to a predetermined value (the 2nd gear engagement load) on the positive side and the sleeve 22 is engaged to the gear 2.

When the sleeve 22 is engaged to the gear 2 at the time t8, the shifting ends. However, since the torque of the engine 7 is transferred by the 6th gear synchronic transfer path, as shown in FIG. 17(J), Tout becomes equal to G6×Te. Here, G6 indicates a reduction ratio of the 6th gear. After the shifting ends at the time t8, as shown in FIG. 17(E), the target shift B load TFSFTB is kept at a predetermined value (the 2nd gear engagement load) on the positive side for a predetermined time. This prevents the engaged sleeve 22 from unexpected disengagement from the gear 2. Further, after end of shifting, as shown in FIG. 17(F), the target shift C load TFSFTC is slowly returned to 0 and the 6th gear synchronic transfer path is switched to the 2nd gear transfer path. At this time, as the target shift C load TFSFTC is changed, as shown in FIG. 17(J), the output torque Tout is slowly increased.

When the target shift C load TFSFTC becomes 0 at the time t9, the torque transferred by the 6th gear synchronic transfer path becomes almost 0 and as shown in FIG. 17(J), the output shaft torque Tout becomes equal to G2×Te. Here, G2 indicates a reduction ratio of the 2nd gear. After the target shift C load TFSFTC becomes 0 at the time t9, to move the sleeve 23 from the 6th gear balk position to the neutral position, as shown in FIG. 17(F), the target shift C load TFSFTC is set to a predetermined value (kept at the neutral position) on the positive side.

When the sleeve 23 is kept at the neutral position at the time t10, as shown in FIG. 17(E), the target shift B load TFSFTB kept at the predetermined value (the 2nd gear engagement load) on the positive side for the predetermined time is returned to 0 and the shift control ends.

As explained above, at the time of down-shift (3rd gear→2nd gear), by the 3-4-6-2 torque transfer that the 3rd gear transfer path formed by the connection of the gear 3 and the shift C is switched to the 4th gear synchronic transfer path formed by the synchronizer 54 of the 4th gear, and then the 4th gear synchronic transfer path is switched to the 6th gear synchronic transfer path formed by the synchronizer 56 of the 6th gear, and furthermore the 6th gear synchronic transfer path is switched to the 2nd gear transfer path formed by the connection of the gear 2 and the shift B, the shifting can be carried out without the drive torque being interrupted.

Moreover, the 3-4-6-2 torque transfer is carried out using two synchronizeres, so that the 4th gear synchronic accumulated heat quality SSQSYN4 can be reduced smaller that that by the 3-4-2 torque transfer. Therefore, a sudden temperature rise of the frictional surface of each synchronizer can be prevented beforehand and the synchronizeres can be prevented from abrasion.

Further, the 3-5-6-2 torque transfer may be carried out using the synchronizer 55 of the 5th gear in place of the synchronizer 54 of the 4th gear. Namely, any synchronizer installed in a gear train having a smaller reduction ratio than that of the 3rd gear which is the gear position at the start time of shifting can be substituted. In this case, when a synchronizer installed in a gear train having a larger reduction ratio than that of the 3rd gear is used, the torque cannot be transferred from the 3rd gear transfer path. Further, in the constitution of the transmission shown in FIG. 1, the sleeve 23 is used in both the 3rd gear and 6th gear, so that the synchronizer 56 of the 6th gear, even if its reduction ratio is smaller than that of the 3rd gear, cannot be used from the viewpoint of structure.

Furthermore, the 3-4-3-2 torque transfer may be carried out using the synchronizer of the 3rd gear in place of the synchronizer 56 of the 6th gear. Namely, a synchronizer other than the synchronizer at the target gear position (the 2nd gear in this embodiment) and the synchronizer (the 4th gear in this embodiment) used just prior can be substituted. Further, in the constitution of the transmission shown in FIG. 1, the sleeve 21 is used for both the 1st gear and 4th gear and the sleeve 22 is used for both the 2nd gear and 5th gear, so that the synchronizer is limited to the synchronizer 56 of the 6th gear or the synchronizer 53 of the 3rd gear.

Further, in FIG. 7, the synchronizer 54 of the 4th gear and the synchronizer 56 of the 6th gear are switched, thus the torque transfer during shifting is realized. However, like the 3rd gear transfer path→the 4th gear synchronic transfer path→the 2nd gear transfer path, the torque transfer during shifting may be realized by one synchronizer. Furthermore, if the aforementioned restriction can be satisfied, like the 3rd gear transfer path→the 4th gear synchronic transfer path→the 5th gear synchronic transfer path→the 6th gear synchronic transfer path→the 2nd gear transfer path, the torque transfer during shifting may be realized by switching three or more synchronizeres.

Next, by referring to FIG. 18, at the time of down-shift (3rd gear→2nd gear), the shift control by the 3-4-2 torque transfer at the 4th gear position at Step 1207 shown in FIG. 7 will be explained. Namely, like the 3rd gear transfer path→the 4th gear synchronic transfer path→the 2nd gear transfer path, the torque transfer during shifting is realized using one synchronizer.

FIG. 18 is a time chart under shift control by the 3-4-2 torque transfer in the car control unit according to an embodiment of the present invention. The axis of abscissa shown in FIG. 18 indicates the time. The time from t1 to t3 corresponds to the operation under the disengagement control at Step 903 shown in FIG. 9. The time from t3 to t5 corresponds to the operation under the rotation synchronization control at Step 905 shown in FIG. 9. The time from t5 to t6 corresponds to the operation under the engagement control at Step 907 shown in FIG. 9. The time from t6 to t7 corresponds to the operation under the shift end control at Step 909 shown in FIG. 9. Further, in the axis of ordinate shown in FIG. 18, FIG. 18(A) to FIG. 18(J) are the same as those shown in FIG. 17.

When a shift instruction is issued at the time t1 and the shift control is started, the synchronizer 54 of the 4th gear is selected by the synchronizer selection means 302 shown in FIG. 3. And, as shown in FIG. 18(D), the target shift A load TFSFTA is slowly increased on the negative side. Further, as shown in FIG. 18(F), the target shift C load TFSFTC is set to a small value (pre-disengagement) on the negative side, and when the torque transferred by the 3rd gear transfer path becomes almost 0, the sleeve 23 is set up to be disengaged immediately.

At the time t2, the torque is slowly transferred from the 3rd gear transfer path to the 4th gear synchronic transfer path and as shown in FIG. 18(J), the output shaft torque Tout is also reduced slowly.

At the time t3, the torque transferred by the 3rd gear transfer path becomes almost 0 and as shown in FIG. 18(J), the output shaft torque Tout is set to G4×Te. When the torque transferred by the 3rd gear transfer path becomes almost 0, the sleeve 23 is disengaged from the gear 3 under the pre-disengagement control of the shift C and the torque of the engine 7 is transferred to the output shaft by the 4th gear synchronic transfer path.

After the sleeve 23 is disengaged from the gear 3 at the time t3, to keep the sleeve 23 at the neutral position, as shown in FIG. 18(F), the target shift C load TFSFTC is set to a predetermined value (kept at the neutral position) on the negative side. After switched to the 4th gear synchronic transfer path, so as to allow the input shaft speed Ni to follow a desired speed track, as shown in FIG. 18(D), the target shift A load TFSFTA is set.

Thereafter, when it is judged that the synchronizer 54 of the 4th gear will not be switched to another synchronizer by the synchronizer selection means 302 shown in FIG. 3, at the time t4, as shown in FIG. 18(E), the target shift B load TFSFTB is slowly increased on the positive side and the sleeve 22 is moved. When the input shaft speed Ni approaches the speed (the speed of the gear 2) equivalent to the 2nd gear, as shown in FIG. 18(E), the target shift B load TFSFTB is increased up to a predetermined value (the 2nd gear engagement load) on the positive side and the sleeve 22 is engaged to the gear 2.

When the sleeve 22 is engaged to the gear 2 at the time t5, the shifting ends. However, since the torque of the engine 7 is transferred by the 4th gear synchronic transfer path, as shown in FIG. 18(J), Tout becomes equal to G4×Te. After the shifting ends at the time t5, as shown in FIG. 18(E), the target shift B load TFSFTB is kept at a predetermined value (the 2nd gear engagement load) on the positive side for a predetermined time. This prevents the engaged sleeve 22 from unexpected disengagement from the gear 2. Further, after end of shifting, as shown in FIG. 18(D), the target shift A load TFSFTA is slowly returned to 0 and the 4th gear synchronic transfer path is transferred to the 2nd gear transfer path. At this time, as the target shift A load TFSFTA is changed, as shown in FIG. 18(J), the output torque Tout is slowly increased.

As shown in FIG. 18(D), when the target shift A load TFSFTA becomes 0 at the time t6, the torque transferred by the 4th gear synchronic transfer path becomes almost 0 and as shown in FIG. 18(J), the output shaft torque Tout becomes equal to G2×Te.

After the target shift A load TFSFTA becomes 0 at the time t6, to move the sleeve 21 from the 4th gear balk position to the neutral position, as shown in FIG. 18(D), the target shift A load TFSFTA is set to a predetermined value (kept at the neutral position) on the positive side.

When the sleeve 21 is kept at the neutral position at the time t7, as shown in FIG. 18(E), the target shift B load TFSFTB kept at the predetermined value (the 2nd gear engagement load) on the positive side for the predetermined time is returned to 0 and the shift control ends.

As explained above, according to this embodiment, the heat quantity inferred value of the synchronizer is calculated at the start time of shift control and the synchronizer for forming the torque transfer path during shifting according to the calculated heat quantity inferred value is selected, thus a sudden temperature rise of the frictional surface of the synchronizer can be prevented beforehand and the abrasion of the synchronizer can be suppressed.

Further, in the above example, during shifting of 3-2, the torque transfer by the synchronizer 54 of the 4th gear and the torque transfer by switching the synchronizer 54 of the 4th gear to the synchronizer 56 of the 6th gear are selected according to the heat quantity inferred value. However, any synchronizer capable of carrying out torque transfer during shifting according to the layout (gear arrangement, synchronizer mechanism arrangement, etc.) of the transmission 50 may be selected. For example, during shifting of 3-2, torque transfer may be carried out by switching the synchronizer 54 of the 4th gear to the synchronizer 53 of the 3rd gear or torque transfer may be carried out by switching the synchronizer 55 of the 5th gear to the synchronizer 54 of the 4th gear.

Further, during shifting of 2-1, a case of carrying out torque transfer during shifting only by the synchronizer 53 of the 3rd gear or a case of carrying out torque transfer during shifting only by the synchronizer 56 of the 6th gear may be considered, so that a method is available that the heat quantity inferred values of the synchronizer 53 of the 3rd gear and the synchronizer 56 of the 6th gear are calculated and according to the calculated heat quantity inferred values, either of the synchronizer 53 of the 3rd gear and the synchronizer 56 of the 6th gear is selected.

Next, by referring to FIG. 19, the shift control when, at the time of down shift (3rd gear→2nd gear), torque transfer at the 4th gear position at Step 1207 shown in FIG. 7 is set to 3-4-2 torque transfer and moreover torque reduction is set at Step 1309 shown in FIG. 8 will be explained.

Figure 19:
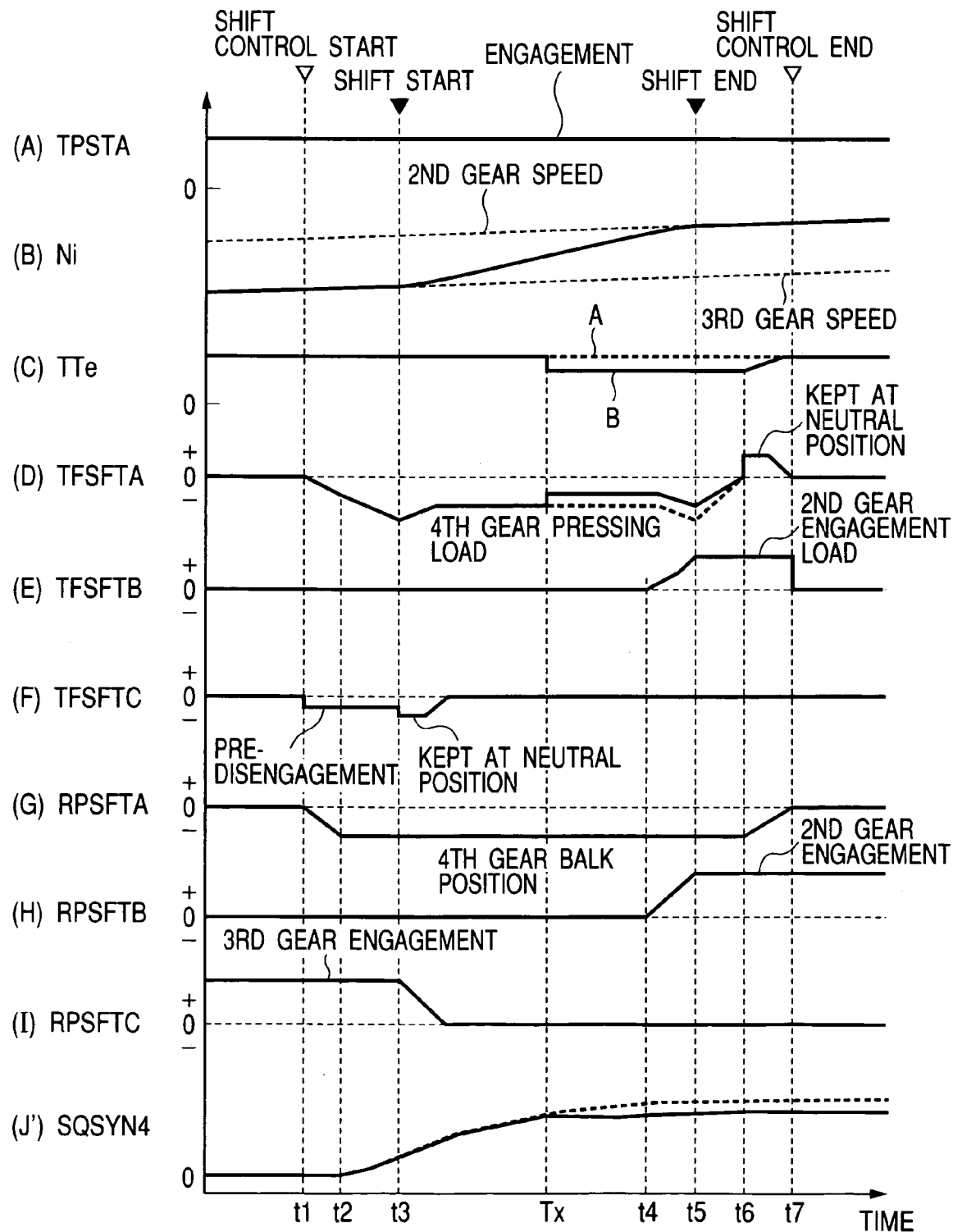
FIG. 19 is a time chart under shift control by the 3-4-2 torque transfer when torque reduction is set in the car control unit according to an embodiment of the present invention.

FIG. 19 is a time chart under shift control by the 3-4-2 torque transfer during setting of torque reduction in the car control unit according to an embodiment of the present invention. The axis of abscissa shown in FIG. 19 indicates the time. The time from t1 to t7 is the same as that shown in FIG. 18. Further, the time tx indicates the time when torque reduction is set. Further, in the axis of ordinate shown in FIG. 19, FIG. 19(A) to FIG. 19(I) are the same as those shown in FIG. 17. FIG. 19(J') shows the 4th gear synchronic heat quantity SQSYN4. The 4th gear synchronic heat quantity SQSYN4 is an inferred value of the heat quantity generated in the synchronizer 54 of the 4th gear.

When a shift instruction is issued at the time t1 and the shift control is started, the synchronizer 54 of the 4th gear is selected by the synchronizer selection means 302 shown in FIG. 3. Therefore, by the processes at Step 1507 shown in FIG. 10 and Step 1605 shown in FIG. 11, as shown in FIG. 19(D), the target shift A load TFSFTA is slowly increased on the negative side. Further, by the process at Step 1605 shown in FIG. 11, as shown in FIG. 19(F), the target shift C load TFSFTC is set to a small value (pre-disengagement) on the negative side and when the torque transferred by the 3rd gear transfer path becomes almost 0, the sleeve 23 is set up to be disengaged immediately.

At the time t2, the torque is slowly transferred from the 3rd gear transfer path to the 4th gear synchronic transfer path and at the time t3, the torque transferred by the 3rd gear transfer path becomes almost 0. When the torque transferred by the 3rd gear transfer path becomes almost 0, as shown in FIG. 19(F), the sleeve 23 is disengaged from the gear 3 under the pre-disengagement control of the shift C and the torque of the engine 7 is transferred to the output shaft by the 4th gear synchronic transfer path.

After the sleeve 23 is disengaged from the gear 3 at the time t3, to keep the sleeve 23 at the neutral position, as shown in FIG. 19(F), the target shift C load TFSFTC is set to a predetermined value (kept at the neutral position) on the negative side. After switched to the 4th gear synchronic transfer path, so as to allow the input shaft speed Ni to follow a desired speed track, by the processes at Step 1508 shown in FIG. 10 and Step 1605 shown in FIG. 11, the target engine torque TTe and the target shift A load TFSFTA are set.

Thereafter, when the 4th gear synchronic heat quantity SQSYN4 inferred by the state discrimination means 301 shown in FIG. 3 reaches a predetermined threshold value at the time Tx, that is, when the decision at Step 1308 shown in FIG. 8 is NO and the torque reduction flag fEGTQDN is set to 1 at Step 1309, to prevent the frictional surface of the synchronizer 54 from a sudden temperature rise, by the engine torque control means 303 shown in FIG. 3 and the process at Step 1808 shown in FIG. 13, the target engine torque TTe is reduced. In FIG. 19(C), the state indicated by the dashed line A is a case that the target engine torque TTe is not reduced and the state indicated by the solid line B is a case that the target engine torque TTe is reduced in this example.

Under this control, the torque of the engine 7 to be transferred by the synchronizer 54 reduces lower than the engine torque equivalent to the accelerator opening, so that as shown by a solid line in FIG. 19(D), the absolute value of the target shift A load TFSFTA also reduces. Therefore, as shown by a dashed line in FIG. 19(J'), compared with a case that the target engine torque TTe is not reduced, as shown by a solid line in FIG. 19(J'), the 4th gear synchronic heat quantity SQSYN4 increases slowly and the heat quantity generated in the synchronizer 54 is reduced. As a result, the frictional surface of the synchronizer 54 can be prevented from a sudden temperature rise and the synchronizer 54 can be prevented from abrasion.

Thereafter, when it is judged that the synchronizer 54 of the 4th gear will not be switched to another synchronizer by the synchronizer selection means 302 shown in FIG. 3, at the time t4, as shown in FIG. 19(E), the target shift B load TFSFTB is slowly increased on the positive side and the sleeve 22 is moved. When the input shaft speed Ni approaches the speed (the speed of the gear 2) equivalent to the 2nd gear, as shown in FIG. 19(E), the target shift B load TFSFTB is increased up to a predetermined value (the 2nd gear engagement load) on the positive side and the sleeve 22 is engaged to the gear 2.

When the sleeve 22 is engaged to the gear 2 at the time t5, the shifting ends. After the shifting ends at the time t5, as shown in FIG. 19(E), the target shift B load TFSFTB is kept at a predetermined value (the 2nd gear engagement load) on the positive side for a predetermined time. Further, after end of shifting, as shown in FIG. 19(D), the target shift A load TFSFTA is slowly returned to 0 and the 4th gear synchronic transfer path is transferred to the 2nd gear transfer path.

As shown in FIG. 19(D), when the target shift A load TFSFTA becomes 0 at the time t6, the torque transferred by the 4th gear synchronic transfer path becomes almost 0. After the target shift A load TFSFTA becomes 0, to move the sleeve 21 from the 4th gear balk position to the neutral position, as shown in FIG. 19(D), the target shift A load TFSFTA is set to a predetermined value (kept at the neutral position) on the positive side. Further, by the process at Step 1510 shown in FIG. 10, as shown in FIG. 19(C), the target engine torque TTe is slowly returned to the torque equivalent to the accelerator opening.

At the time t7, when the sleeve 21 is kept at the neutral position and the target engine torque TTe is returned to the torque equivalent to the accelerator opening, as shown in FIG. 19(D), the target shift B load TFSFTB kept at the predetermined value (the 2nd gear engagement load) on the positive side for the predetermined time is returned to 0 and the shift control ends.

Next, by referring to FIG. 20, the shift control when, at the time of down shift (3rd gear→2nd gear), torque transfer at the 4th gear position at Step 1207 shown in FIG. 7 is set to 3-4-2 torque transfer and moreover clutch disengagement is set at Step 1310 shown in FIG. 8 will be explained.

Figure 20:
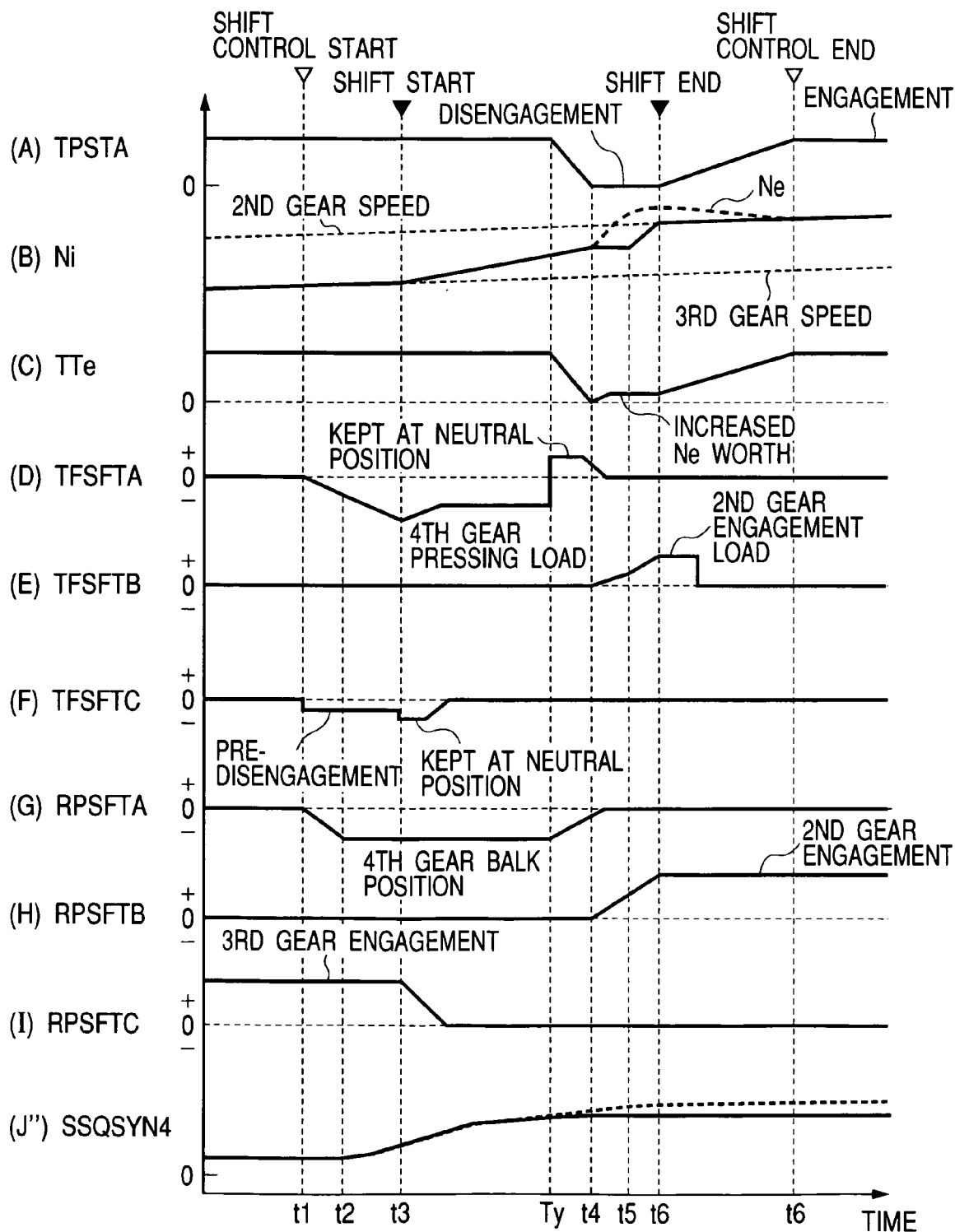
FIG. 20 is a time chart under shift control by the 3-4-2 torque transfer when clutch disengagement is set in the car control unit according to an embodiment of the present invention.

FIG. 20 is a time chart under shift control by the 3-4-2 torque transfer during setting of clutch disengagement in the car control unit according to an embodiment of the present invention. The axis of abscissa shown in FIG. 20 indicates the time. The time from t1 to t7 is the same as that shown in FIG. 18. Further, the time ty indicates the time when clutch disengagement is set. Further, in the axis of ordinate shown in FIG. 20, FIG. 20(A) to FIG. 20(I) are the same as those shown in FIG. 17. FIG. 20(J") shows the 4th gear synchronic accumulated heat quantity SSQSYN4. The 4th gear synchronic accumulated heat quantity SSQSYN4 is an inferred value of the heat quantity accumulated in the synchronizer 54 of the 4th gear.

When a shift instruction is issued at the time t1 and the shift control is started, the synchronizer 54 of the 4th gear is selected by the synchronizer selection means 302 shown in FIG. 3. And, by the process at Step 1507 shown in FIG. 10, as shown in FIG. 20(D), the target shift A load TFSFTA is slowly increased on the negative side. Further, as shown in FIG. 20(F), the target shift C load TFSFTC is set to a small value (pre-disengagement) on the negative side and when the torque transferred by the 3rd gear transfer path becomes almost 0, the sleeve 23 is set up to be disengaged immediately.

At the time t2, the torque is slowly transferred from the 3rd gear transfer path to the 4th gear synchronic transfer path and at the time t3, the torque transferred by the 3rd gear transfer path becomes almost 0. When the torque transferred by the 3rd gear transfer path becomes almost 0, the sleeve 23 is disengaged from the gear 3 under the pre-disengagement control of the shift C and the torque of the engine 7 is transferred to the output shaft by the 4th gear synchronic transfer path.

After the sleeve 23 is disengaged from the gear 3 at the time t3, to keep the sleeve 23 at the neutral position, by the processes at Step 1508 shown in FIG. 10 and Step 1605 shown in FIG. 11, as shown in FIG. 20(F), the target shift C load TFSFTC is set to a predetermined value (kept at the neutral position) on the negative side. After switched to the 4th gear synchronic transfer path, so as to allow the input shaft speed Ni to follow a desired speed track, by the processes at Step 1508 shown in FIG. 10 and Step 1605 shown in FIG. 11, the target engine torque TTe and the target shift A load TFSFTA are set.

Thereafter, when the 4th gear synchronic accumulated heat quantity SSQSYN4 inferred by the state discrimination means 301 shown in FIG. 3 reaches a predetermined threshold value at the time Ty, that is, when the decision at Step 1308 shown in FIG. 8 is YES and the clutch disengagement flag fCOFSFT is set to 1 at Step 1310, to prevent the frictional surface of the synchronizer 54 from a sudden temperature rise, control is executed so as to disengage the clutch 8 by the shift mode switching means 304 shown in FIG. 3 and engage the sleeve 22 to the gear 2 is executed. Firstly, by the process at Step 1706 shown in FIG. 12, as shown in FIG. 20(C), the target engine torque TTe is slowly reduced to 0 and as shown in FIG. 20(A), the target clutch position TPSTA is reduced on the disengagement side. Furthermore, to keep the sleeve 21 at the neutral position, by the process at Step 1605 shown in FIG. 11, as shown in FIG. 20(D), the target shift A load TFSFTA is set to a predetermined value on the positive side. Under this control, the heat quantity generated in the synchronizer 54 is not increased and the 4th gear synchronic accumulated heat quantity SSQSYN4 is prevented from increasing. As a result, the frictional surface of the synchronizer 54 can be prevented from a sudden temperature rise and the synchronizer 54 can be prevented from abrasion.

After the clutch 8 is disengaged at the time t4, as shown in FIG. 20(E), the target shift B load TFSFTB is slowly increased on the positive side and the sleeve 22 is moved. Thereafter, as shown in FIG. 20(E), the target shift B load TFSFTB is slowly increased up to a predetermined value (the 2nd gear engagement load) on the positive side and the sleeve 22 is engaged to the gear 2. At this time, the input shaft speed Ni increases up to the speed (the speed of the gear 2) equivalent to the 2nd gear by the synchronizer 52.

When the sleeve 22 is engaged to the gear 2 at the time t6, the shifting ends. Between the time t4 and t6, the target engine torque TTe is set to a predetermined value so that the speed Ne of the engine 7 increases close to the speed (the speed of the gear 2) equivalent to the 2nd gear.

When the shifting ends at the time t6, as shown in FIG. 20(E), the target shift B load TFSFTB is kept at the predetermined value (the 2nd gear engagement load) on the positive side for a predetermined time. Further, the target engine torque TTe is slowly returned to the torque equivalent to the accelerator opening and the target clutch position TPSTA is slowly increased on the engagement side.

At the time t7, as shown in FIG. 20(B), the engine speed Ne and the input shaft speed Ni become equal to each other and when the clutch 8 is perfectly engaged, the shift control ends.

Next, by referring to FIG. 21, the shift control when, at the time of down shift (3rd gear 2nd gear), torque transfer at the 4th gear position at Step 1207 shown in FIG. 7 is set to 3-4-2 torque transfer and moreover the engine torque is controlled on the basis of the heat quantity of the synchronizer which is expected before shifting will be explained.

Figure 21:
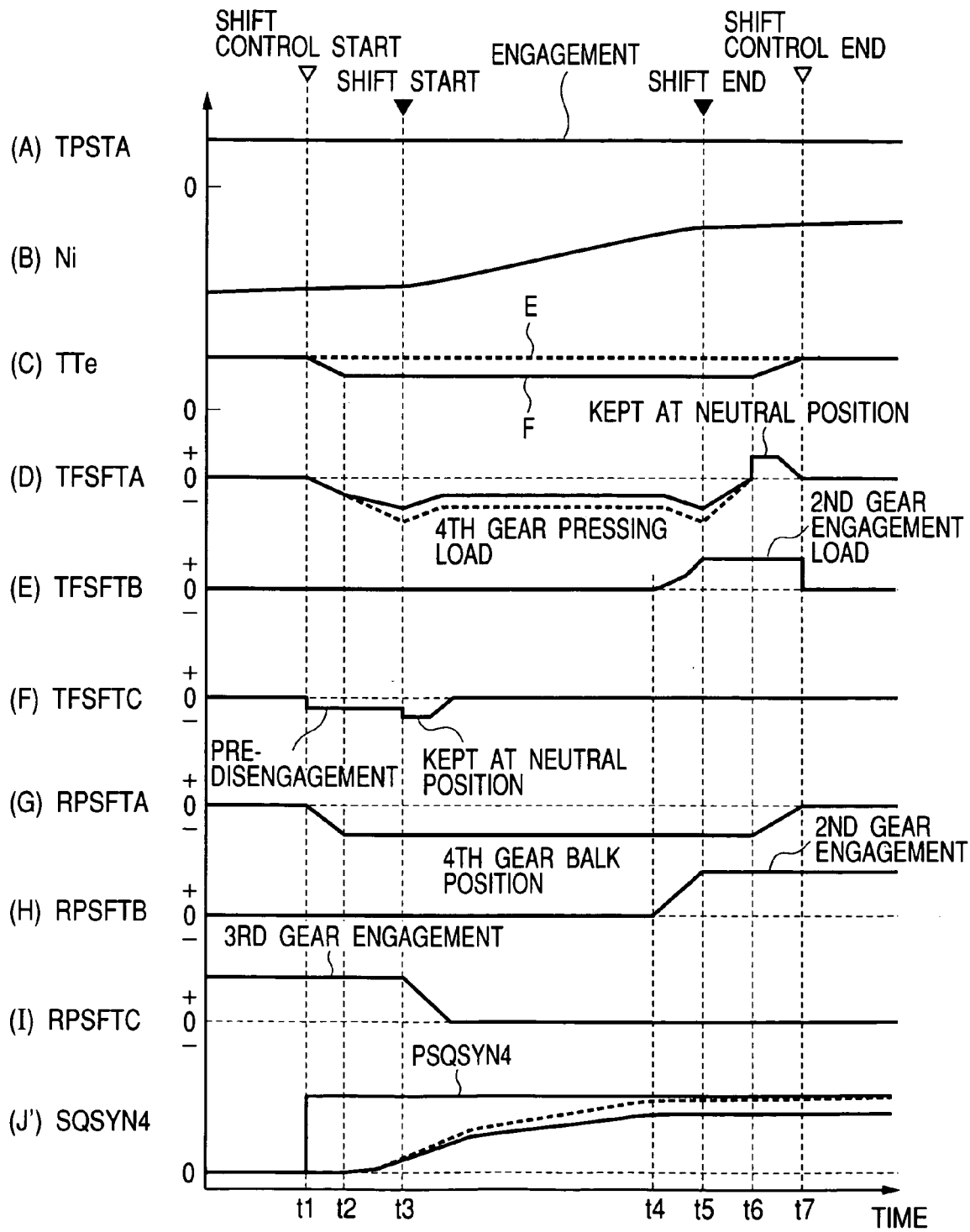
FIG. 21 is a time chart under shift control by the 3-4-2 torque transfer when the engine torque is controlled on the basis of the heat quantity of the synchronizer expected before shifting in the car control unit according to an embodiment of the present invention.

FIG. 21 is a time chart under shift control by the 3-4-2 torque transfer when the engine torque is controlled on the basis of the heat quantity of the synchronizer expected before shifting in the car control unit according to an embodiment of the present invention. The axis of abscissa shown in FIG. 21 indicates the time. The time from t1 to t7 is the same as that shown in FIG. 18. Further, in the axis of ordinate shown in FIG. 21, FIG. 21(A) to FIG. 21(I) are the same as those shown in FIG. 17. FIG. 21(J') shows the 4th gear synchronic heat quantity SQSYN4 and the 4th gear synchronic expected heat quantity PSQSYN4. The 4th gear synchronic expected heat quantity PSQSYN4 is an inferred value of the heat quantity expected to be generated in the synchronizer 54 at the time of next shifting.

This embodiment controls the engine torque on the basis of the heat quantity of the synchronizer expected before shifting and it is a case that torque reduction is already set at the point of time t1 at Step 1309 shown in FIG. 8.

When a shift instruction is issued at the time t1 and the shift control is started, the synchronizer 54 of the 4th gear is selected by the synchronizer selection means 302 shown in FIG. 3. And, by the process at Step 1507 shown in FIG. 10, as shown in FIG. 21(D), the target shift A load TFSFTA is slowly increased on the negative side. Further, as shown in FIG. 21(F), the target shift C load TFSFTC is set to a small value (pre-disengagement) on the negative side and when the torque transferred by the 3rd gear transfer path becomes almost 0, the sleeve 23 is set up to be disengaged immediately. Further, when the 4th gear synchronic expected heat quantity PSQSYN4 is calculated by the state discrimination means 301 shown in FIG. 3 and the 4th gear synchronic expected heat quantity PSQSYN4 is more than a predetermined threshold value, that is, when the decision at Step 1308 shown in FIG. 8 is YES and the clutch disengagement flag fCOFSFT is set to 1 at Step 1310, the engine torque control means 304, by the process at Step 1808 shown in the drawing, as shown in FIG. 21(D), reduces the target engine torque TTe down to the value obtained by multiplying the torque equivalent to the accelerator opening by a coefficient of α [%]. In FIG. 21(D), the solid line F indicates a case that the torque is reduced in this example. The dashed line E indicates a case that the torque is not reduced and it is the same as that indicated by the solid line shown in FIG. 18(D).

At the time t2, the target engine torque TTe reaches the value obtained by multiplying the torque equivalent to the accelerator opening by a coefficient of α [%], and then the torque is slowly transferred from the 3rd gear transfer path to the 4th gear synchronic transfer path, and at the time t3, the torque transferred by the 3rd gear transfer path becomes almost 0. When the torque transferred by the 3rd gear transfer path becomes almost 0, the sleeve 23 is disengaged from the gear 3 under the pre-disengagement control of the shift C and the torque of the engine 7 is transferred to the output shaft by the 4th gear synchronic transfer path.

After the sleeve 23 is disengaged from the gear 3 at the time t3, to keep the sleeve 23 at the neutral position, by the processes at Step 1508 shown in FIG. 10 and Step 1605 shown in FIG. 11, as shown in FIG. 21(F), the target shift C load TFSFTC is set to a predetermined value (kept at the neutral position) on the negative side. After switched to the 4th gear synchronic transfer path, so as to allow the input shaft speed Ni to follow a desired speed track, by the processes at Step 1508 shown in FIG. 10 and Step 1605 shown in FIG. 11, the target engine torque TTe and the target shift A load TFSFTA are set. At this time, since the target engine torque TTe is reduced before shifting beforehand, as shown by the solid line in FIG. 21(D), the absolute value of the target shift A load TFSFTA is smaller than that indicated by the dashed line.

Therefore, the increase of the 4th gear synchronic heat quantity SQSYN4, as indicated by the solid line in FIG. 21(J'), is slower than that in the example of the dashed line (equivalent to the example shown in FIG. 18) in FIG. 21(J') and the heat quantity generated in the synchronizer 54 is reduced. And, as shown in FIG. 21(J'), the 4th gear synchronic heat quantity SQSYN4 becomes smaller than the 4th gear synchronic expected heat quantity PSQSYN4. As a result, the frictional surface of the synchronizer 54 can be prevented from a sudden temperature rise and the synchronizer 54 can be prevented from abrasion.

Thereafter, when it is judged that the synchronizer 54 of the 4th gear will not be switched to another synchronizer by the synchronizer selection means 302 shown in FIG. 3, at the time t4, as shown in. FIG. 21(E), the target shift B load TFSFTB is slowly increased on the positive side and the sleeve 22 is moved. When the input shaft speed Ni approaches the speed (the speed of the gear 2) equivalent to the 2nd gear, as shown in FIG. 21(E), the target shift B load TFSFTB is increased up to a predetermined value (the 2nd gear engagement load) on the positive side and the sleeve 22 is engaged to the gear 2.

When the sleeve 22 is engaged to the gear 2 at the time t5, the shifting ends. After the shifting ends at the time t5, as shown in FIG. 21(E), the target shift B load TFSFTB is kept at a predetermined value (the 2nd gear engagement load) on the positive side for a predetermined time. Further, after end of shifting, as shown in FIG. 21(D), the target shift A load TFSFTA is slowly returned to 0 and the 4th gear synchronic transfer path is transferred to the 2nd gear transfer path.

When the target shift A load TFSFTA becomes 0 at the time t6, the torque transferred by the 4th gear synchronic transfer path becomes almost 0. After the target shift A load TFSFTA becomes 0, to move the sleeve 21 from the 4th gear balk position to the neutral position, as shown in FIG. 21(D), the target shift A load TFSFTA is set to a predetermined value (kept at the neutral position) on the positive side. Further, as shown in FIG. 21(C), the target engine torque TTe is slowly returned to the torque equivalent to the accelerator opening.

At the time t7, when the sleeve 21 is kept at the neutral position and the target engine torque TTe is returned to the torque equivalent to the accelerator opening, as shown in FIG. 21(D), the target shift B load TFSFTB kept at the predetermined value (the 2nd gear engagement load) on the positive side for the predetermined time is returned to 0 and the shift control ends.

Figure 22:
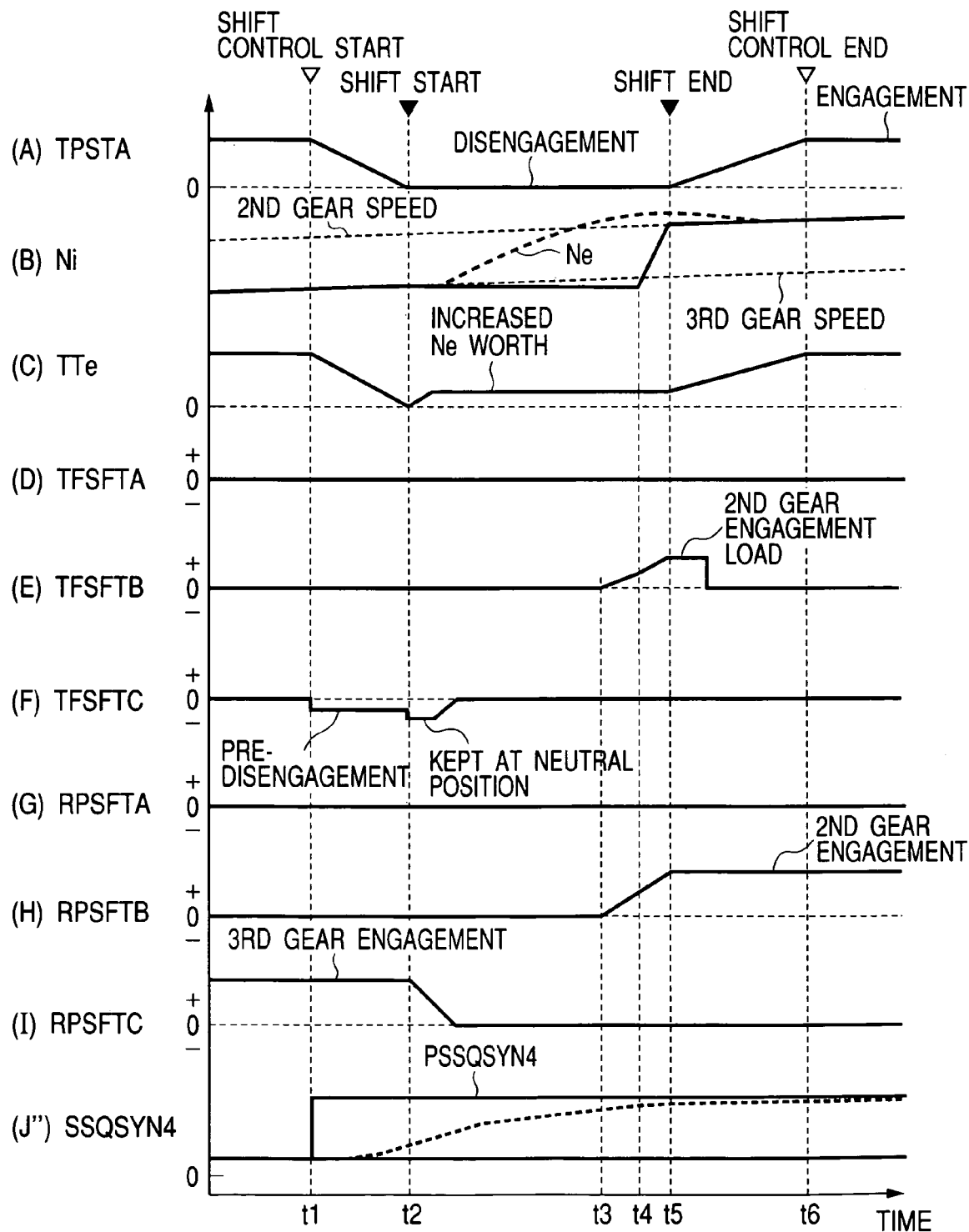
FIG. 22 is a time chart under shift control by the 3-4-2 torque transfer when the clutch is disengaged on the basis of the heat quantity of the synchronizer expected before shifting in the car control unit according to an embodiment of the present invention.

FIG. 22 is a time chart under shift control by the 3-4-2 torque transfer when the clutch is disengaged on the basis of the heat quantity of the synchronizer expected before shifting in the car control unit according to an embodiment of the present invention.

The axis of abscissa shown in FIG. 22 indicates the time. The time from t1 to t2 corresponds to the operation under the disengagement control at Step 903 shown in FIG. 9. The time from t2 to t5 corresponds to the operation under the rotation synchronization control at Step 905 shown in FIG. 9. The time from t5 to t6 corresponds to the operation under the engagement control at Step 907 shown in FIG. 9 and the operation under the shift end control at Step 909 shown in FIG. 9. Further, in the axis of ordinate shown in FIG. 22, FIG. 22(A) to FIG. 22(I) are the same as those shown in FIG. 17. FIG. 22(J″) shows the 4th gear synchronic accumulated heat quantity SSQSYN4 and the 4th gear synchronic expected accumulated heat quantity PSSQSYN4. The 4th gear synchronic expected accumulated heat quantity PSSQSYN4 is an inferred value of the heat quantity expected to be accumulated in the synchronizer 54 of the 4th gear during the next shifting.

This embodiment controls clutch disengagement on the basis of the heat quantity of the synchronizer expected before shifting and it is a case that clutch disengagement is already set at the point of time t1 at Step 1310 shown in FIG. 8.

When a shift instruction is issued at the time t1 and the shift control is started, the synchronizer 54 of the 4th gear is selected by the synchronizer selection means 302 shown in FIG. 3. Further, when the 4th gear synchronic expected accumulated heat quantity PSSQSYN4 is calculated by the state discrimination means 301 shown in FIG. 3 and the 4th gear synchronic expected accumulated heat quantity PSSQSYN4 is more than a predetermined threshold value, that is, when the decision at Step 1308 shown in FIG. 8 is YES and the clutch disengagement flag fCOFSFT is set to 1 at Step 1310, the clutch 8 is disengaged by the shift mode switching means 304 and the shifting is carried out. Therefore, as shown in FIG. 22(C), the target engine torque TTe is slowly reduced to 0 and as shown in FIG. 22(A), the target clutch position TPSTA is slowly reduced on the disengagement side. At this time, the target shift A load TFSFTA, as shown in FIG. 22(D), is set to 0. Further, as shown in FIG. 22(F), the target shift C load TFSFTC is set to a small value (pre-disengagement) on the negative side and when the torque transferred by the 3rd gear transfer path becomes almost 0 by disengagement of the clutch 8, the sleeve 23 is set up to be disengaged immediately.

At the time t2, as shown in FIG. 22(C), the target engine torque TTe becomes 0, and the clutch 8 is disengaged, and then the torque transferred by the 3rd gear transfer path becomes almost 0. When the torque transferred by the 3rd gear transfer path becomes almost 0, the sleeve 23 is disengaged from the gear 3 under the pre-disengagement control of the shift C. After the sleeve 23 is disengaged from the gear 3, to keep the sleeve 23 at the neutral position, as shown in FIG. 22(F), the target shift C load TFSFTC is set to a predetermined value (kept at the neutral position) on the negative side.

The clutch 8 is disengaged, thus the torque transfer between the engine 7 and the input shaft 41 is interrupted like this, so that the heat quantity generated in the synchronizer 54 is not increased, and the 4th gear synchronic accumulated heat quantity SSQSYN4 is prevented from increasing, and as shown by the solid line in FIG. 22(J″), the 4th gear synchronic accumulated heat quantity SSQSYN4 becomes smaller than the 4th gear synchronic expected accumulated heat quantity PSSQSYN4. Further, the 4th gear synchronic accumulated heat quantity SSQSYN4 becomes smaller than the 4th gear synchronic accumulated heat quantity SSQSYN4 shown in FIG. 20(J″) which is indicated by the dashed line in FIG. 22(J″). As a result, the frictional surface of the synchronizer 54 can be prevented from a sudden temperature rise and the synchronizer 54 can be prevented from abrasion.

After the clutch 8 is disengaged at the time t2, as shown in FIG. 22(E), the target shift B load TFSFTB is slowly increased on the positive side at the time t3 and the sleeve 22 is moved. After the sleeve 22 is moved to a predetermined position at the time 4, as shown in FIG. 22(E), the target shift B load TFSFTB is increased up to a predetermined value (the 2nd gear engagement load) on the positive side and the sleeve 22 is engaged to the gear 2. At this time, the input shaft speed Ni increases up to the speed (the speed of the gear 2) equivalent to the 2nd gear by the synchronizer 52.

When the sleeve 22 is engaged to the gear 2 at the time t5, the shifting ends. Between the time t2 and t5, the target engine torque TTe, as shown in FIG. 22(C), is set to a predetermined value so that the speed Ne of the engine 7 increases close to the speed (the speed of the gear 2) equivalent to the 2nd gear.

When the shifting ends at the time t5, as shown in FIG. 22(E), the target shift B load TFSFTB is kept at the predetermined value (the 2nd gear engagement load) on the positive side for a predetermined time. Further, as shown in FIG. 22(C), the target engine torque TTe is slowly returned to the torque equivalent to the accelerator opening and as shown in FIG. 22(A), the target clutch position TPSTA is slowly increased on the engagement side.

At the time t6, as shown in FIG. 22(B), the engine speed Ne and the input shaft speed Ni become equal to each other and when the clutch 8 is perfectly engaged, the shift control ends.

Further, in the above explanation, as a parameter indicating the state of the frictional surface of the synchronizer, a heat quantity inferred value of the synchronizer is used. However, any parameter capable of inferring the temperature of the frictional surface of the synchronizer may be used. For example, a temperature sensor is attached to each synchronizer and using the temperature of each synchronizer detected by each temperature sensor, the aforementioned shift control may be executed.

Further, a heat quantity inferred value of each synchronizer is calculated, and the temperature of the synchronizer is inferred according to the shape and weight of the synchronizer, and using the inferred temperature, the aforementioned shift control can be executed.

Furthermore, the aforementioned shift control may be executed according to the abrasion loss of each synchronizer. For example, when the synchronizer at a predetermined gear position performing the torque transfer during shifting is greatly worn out, the clutch 8 is disengaged and the shifting is carried out, and when the torque can be transferred by the synchronizer though it is slightly worn out, the engine torque is reduced and the torque transfer during shifting is performed, thus the shifting is realized. Further, when the synchronizer at the predetermined gear position cannot be used due to wear, using the synchronizer at another gear position, the torque transfer during shifting is performed. The abrasion loss of each synchronizer can be inferred from the stroke of the sleeve of the synchronizer mechanism. When the synchronizer is worn out, the clearance between the sleeve and the synchronizer is made larger, so that the balk position is changed from that in the normal state. Therefore, it is possible to store the balk position in a state of torque transfer in the power train control unit 100 and infer the abrasion loss of the synchronizer on the basis of the stored balk position.

This embodiment describes mainly the down shift (shifting from the gear position having a small reduction ratio to the gear position having a large reduction ratio). However, this embodiment can be applied similarly to the up shift (shifting from the gear position having a large reduction ratio to the gear position having a small reduction ratio). For example, in the up shift from the 2nd gear to the 3rd gear, 2-4-3 torque transfer, 2-3-4-3 torque transfer, or 2-4-5-3 torque transfer may be performed.

Further, the transmission which can be used in this embodiment is not limited to a transmission of the forward 6th gear and a transmission structured so as to set a gear position of the forward 3rd or higher gear may be used. Further, a transmission structured so as to set a backward gear position may be used. Furthermore, the synchronizer mechanism may be installed in either of the input shaft 41 and the output shaft 42. For example, all the synchronizer setting the gear position may be installed in the input shaft 41 and all the synchronizer setting the gear position may be installed in the output shaft 42.

According to this embodiment, the state of the frictional surface of each synchronizer such as the temperature, heat quantity, and abrasion loss of the frictional surface of the synchronizer is detected and inferred, and the shift control is executed according to at least one parameter indicating the detected or inferred state, thus the load of the synchronizer is lightened and the synchronizer is prevented from damage by a fire.

According to the present invention, the load of each synchronizer is lightened and the synchronizer is prevented from damage by a fire.

What is claimed is:

1. A car control unit for an automatic transmission having a plurality of gears and a plurality of synchronizers capable of transferring a torque from a drive power source to wheels via a clutch, an input shaft, and an output shaft, said car control unit carrying out shifting wherein a first torque transmission path from said input shaft to said output shaft, formed by a first connection between said gears and said synchronizers, is switchable to a second torque transmission path from said input shaft to said output shaft, formed by a second connection via at least one intermediate torque transmission path, formed by a third connection using one of said synchronizers having a smaller reduction ratio than that in the first connection, in a state that said clutch is engaged, further comprising:
state discrimination means for detecting or inferring temperature, heat quantity, or abrasion loss of said synchronizers as a parameter, and
synchronizer selecting means for selecting a synchronizer to form one of said at least one intermediate torque transmission paths according to said parameter detected or inferred by said state discrimination means.

2. A car control unit according to claim 1, wherein said synchronizer selection means, when said parameter is larger than a predetermined value, selects at least two synchronizers to form said intermediate torque transmission path.

3. A car control unit for an automatic transmission having a plurality of gears and a plurality of synchronizing mechanisms capable of transferring a torque from a drive power source to wheels via a friction clutch, an input shaft, and an output shaft, each of said synchronizing mechanisms being provided with a synchronizer capable of transferring a torque by friction, said car control unit carrying out shifting by forming a first torque transmission path from said input shaft to said output shaft by a first connection of said gears and said synchronizing mechanisms, when said first torque transmission path is switched to a second torque transmission path from said input shaft to said output shaft formed by a second connection, transferring a torque from said input shaft to said output shaft by employing at least one synchronizer in a state that said friction clutch is engaged, after forming at least one intermediate torque transmission path by a third connection employing said one synchronizer, transferring said torque of said drive power source from said input shaft to said output shaft first via said at least one intermediate torque transmission path and then via said second torque transmission path, further comprising:
state discrimination means for detecting or inferring temperature, heat quantity, or abrasion loss of said one synchronizer as a parameter, and drive power source torque control means for reducing said torque of said
drive power source according to said parameter detected or inferred by said state discrimination means.

4. A car control unit according to claim 3, wherein
said parameter detected or inferred by said state discrimination means is at least one of the temperature of said frictional surface of said synchronizer, the heat quantity of said synchronizer, and the abrasion loss of the synchronizer and
said drive power source torque control means, when said parameter is larger than a predetermined value, reduces said torque of said drive power source.

5. A car control unit including an automatic transmission having a plurality of gears and a plurality of synchronizers capable of transferring a torque from a drive power source to wheels via a friction clutch, an input shaft, and an output shaft, said synchronizers being capable of transferring said torque by friction, said car control unit having a first shift mode for carrying out shifting by forming a first torque transmission path from said input shaft to said output shaft by connection of said gears and said synchronizers, when switching said connection of said gears and said synchronizers from a first connection to a second connection in a state that said friction clutch is engaged, switching a transfer path formed by said first connection to at least one intermediate transfer path formed by one of said synchronizers and then switching to a transfer path formed by said second connection and a second shift mode for carrying out shifting by, when switching said connection of said gears and said synchronizers from the first connection to the second connection, in a state that said friction clutch is not engaged, switching a transfer path formed by said first connection to a transfer path formed by said second connection, further comprising:
state discrimination means for detecting or inferring a state of a frictional surface of at least one of said synchronizers and
shift mode switching means for switching said first shift mode and said second shift mode according to a parameter indicating said state of said frictional surface detected or inferred by said state discrimination means.

6. A car control unit according to claim 5, wherein:
said parameter indicating said state of said frictional surface detected or inferred by said state discrimination means is at least one of temperature of said frictional surface of said synchronizer, heat quantity of said synchronizer and abrasion loss of said synchronizer, and said shift mode switching means, when said parameter is larger than a predetermined value, switched to.

7. A car control unit including an automatic transmission having a plurality of gears and a plurality of synchronizers capable of transferring a torque from a drive power source to wheels via a friction clutch, an input shaft, and an output shaft, said synchronizers being capable of transferring said torque by friction, said car control unit having a first shift mode for carrying out shifting by forming a first torque transmission path from said input shaft to said output shaft by connection of said gears and said synchronizers, when switching said connection of said gears and said synchronizers from a first connection to a second connection in a state that said friction clutch is engaged, switching a transfer path formed by said first connection to at least one intermediate transfer path formed by one of said synchronizers and then switching to a transfer path formed by said second connection and a second shift mode for carrying out shifting by, when switching said connection of said gears and said synchronizers from the first connection to the second connection, in a state that said friction clutch is not engaged, switching a transfer path formed by said first connection to a transfer path formed by said second connection, further comprising:

state discrimination means for detecting or inferring a state of a frictional surface of at least one of said synchronizers, drive power source torque control means for reducing said torque of said drive power source according to a parameter indicating said state of said frictional surface detected or inferred by said state discrimination means, and shift mode switching means for switching said first shift mode and said second shift mode according to said parameter indicating said state of said frictional surface detected or inferred by said state discrimination means.

8. A car control unit according to claim 7, wherein
said parameter indicating said state of said frictional surface detected or inferred by said state discrimination means is temperature of said frictional surface of said synchronizer, or heat quantity of said synchronizer, or abrasion loss of the synchronizer, said drive power source torque control means, when said parameter is smaller than a predetermined value, reduces said torque of said drive power source in said first shift mode, and said drive power source torque control means, when said parameter is larger than said predetermined value, switches to said second shift mode from said first shift mode.

9. A car control method for an automatic transmission having a plurality of gears and a plurality of synchronizers capable of transferring a torque from a drive power source to wheels via a clutch, an input shaft, and an output shaft, said synchronizers capable of transferring said torque by friction, said car control method carrying out shifting by forming a torque transmission path from said input shaft to said output shaft by connection of said gears and said synchronizers, when switching said connection of said gears and said synchronizer from a first connection to a second connection, in a state that said friction clutch is engaged, switching a transfer path formed by said first connection to at least one intermediate transfer path formed by at least one of said synchronizers and then switching to a transfer path formed by said second connection, further comprising the steps of:

detecting or inferring a state of a frictional surface of said synchronizer and selecting a synchronizer for forming said intermediate transfer path according to a parameter indicating said detected or inferred state.

10. A car control method including an automatic transmission having a plurality of gears and a plurality of synchronizers capable of transferring a torque from a drive power source to wheels via a friction clutch, an input shaft, and an output shaft, said synchronizers being capable of transferring said torque by friction, said car control method carrying out shifting by forming a torque transmission path from said input shaft to said output shaft by connection of said gears and said synchronizers, when switching said connection of said gears and said synchronizers from a first connection to a second connection, in a state that said friction clutch is engaged, switching a transfer path formed by said first connection to at least one intermediate transfer path formed by at least one of said synchronizers and then switching to a transfer path formed by said second connection, further comprising the steps of:

detecting or inferring a state of a frictional surface of said synchronizer and reducing said torque of said drive power source according to a parameter indicating said detected or inferred state.

11. A car control method including an automatic transmission having a plurality of gears and a plurality of synchronizers capable of transferring a torque from a drive power source to wheels via a friction clutch, an input shaft, and an output shaft, said synchronizers being capable of transferring said torque by friction, said car control method having a first mode for carrying out shifting by forming a torque transmission path from said input shaft to said output shaft by connection of said gears and said synchronizers, when switching said connection of said gears and said synchronizers from a first connection to a second connection, in a state that said friction clutch is engaged, switching a transfer path formed by said first connection to at least one intermediate transfer path formed by at least one of said synchronizers and then switching to a transfer path formed by said second connection and a second mode for carrying out shifting by, when switching said connection of said gears and said synchronizer from the first connection to the second connection, in a state that said friction clutch is not engaged, switching a transfer path formed by said first connection to a transfer path formed by said second connection further, comprising the steps of:

detecting or inferring a state of a frictional surface of at least one of said synchronizers and switching said first shift mode and said second shift mode according to a parameter indicating said detected or inferred state.

12. A car control method for an automatic transmission having a plurality of gears and a plurality of synchronizers capable of transferring torque from a drive power source to wheels via a friction clutch, an input shaft, and an output shaft, said synchronizers being capable of transferring said torque by friction, said car control method having a first mode for carrying out shifting by forming a torque transmission path from said input shaft to said output shaft by connection of said gears and said synchronizers, when switching said connection of said gears and said synchronizers from a first connection to a second connection, in a state that said friction clutch is engaged, transferring said torque of said drive power source from said input shaft to said output shaft by employing at least one synchronizer, and switching a transfer path formed by said first connection to at least one intermediate transfer path formed by at least said one synchronizer and then switching to a transfer path formed by said second connection and a second mode for carrying out shifting by, when switching said connection of said gears and said synchronizer from the first connection to the second connection, in a state that said friction clutch is not engaged, switching a transfer path formed by said first connection to a transfer path formed by said second connection, furhter comprising the steps of:

detecting or inferring a state of a frictional surface of at least said one synchronizer and reducing said torque of said drive power source according to a parameter indicating said detected or inferred state or switching said first shift mode and said second shift mode according to a parameter indicating said detected or inferred state.

* * * * *